United States Patent
Wang et al.

(10) Patent No.: US 10,003,664 B2
(45) Date of Patent: *Jun. 19, 2018

(54) METHODS AND SYSTEMS FOR PROCESSING A SAMPLE OF A MEDIA STREAM

(71) Applicant: Shazam Entertainment Ltd., London (GB)

(72) Inventors: Avery Li-Chun Wang, Palo Alto, CA (US); Adrian Allan Revill, Slough (GB)

(73) Assignee: Shazam Entertainment Ltd., London (GB)

( * ) Notice: Subject to any disclaimer, the term of this patent is extended or adjusted under 35 U.S.C. 154(b) by 186 days.

This patent is subject to a terminal disclaimer.

(21) Appl. No.: 15/018,124

(22) Filed: Feb. 8, 2016

(65) Prior Publication Data

US 2016/0156731 A1 Jun. 2, 2016

Related U.S. Application Data

(63) Continuation of application No. 13/101,051, filed on May 4, 2011, now Pat. No. 9,275,141.

(Continued)

(51) Int. Cl.
*G06F 17/00* (2006.01)
*H04L 29/08* (2006.01)
(Continued)

(52) U.S. Cl.
CPC .... *H04L 67/2842* (2013.01); *G06F 17/30743* (2013.01); *G06F 17/30861* (2013.01);
(Continued)

(58) Field of Classification Search
CPC ................................................ G06F 17/30743
See application file for complete search history.

(56) References Cited

U.S. PATENT DOCUMENTS

| 4,450,531 A | 5/1984 | Kenyon et al. |
| 4,843,562 A | 6/1989 | Kenyon et al. |

(Continued)

FOREIGN PATENT DOCUMENTS

WO   WO 2005/101998   11/2005

OTHER PUBLICATIONS

Kim et al., "Music Emotion Recognition: A state of the Art Review", 11th International Society for Music Information Retrieval Conference (2010).

(Continued)

*Primary Examiner* — Thomas Maung
(74) *Attorney, Agent, or Firm* — McDonnell Boehnen Hulbert & Berghoff LLP

(57) ABSTRACT

Methods and systems for processing a sample of a media stream are provided. In one example, a method includes receiving a sample of a media stream rendered by a media rendering source, and for matching media recordings from which the sample was obtained, the method also includes receiving a signature file including a temporally mapped collection of features describing content of the matching media recordings. Each received signature file may be stored in memory. In addition, a signature stream may be received that includes features extracted from the media stream, and a number of matching features between the signature stream of the media stream and the signature file for at least one matching media recording can be determined. In one example, when substantially matching features between the signature stream of the media stream and the signature file for a matching media recording stop occurring, a discontinuity can be identified.

22 Claims, 11 Drawing Sheets

Related U.S. Application Data

(60) Provisional application No. 61/331,015, filed on May 4, 2010, provisional application No. 61/444,458, filed on Feb. 18, 2011.

(51) Int. Cl.
  *G06F 17/30* (2006.01)
  *G11B 27/28* (2006.01)
  *H04N 21/439* (2011.01)
  *H04N 21/8549* (2011.01)
  *H04H 60/37* (2008.01)
  *H04L 29/06* (2006.01)

(52) U.S. Cl.
  CPC ............ *G11B 27/28* (2013.01); *H04H 60/37* (2013.01); *H04L 65/601* (2013.01); *H04N 21/4394* (2013.01); *H04N 21/8549* (2013.01); *H04H 2201/90* (2013.01)

(56) References Cited

U.S. PATENT DOCUMENTS

| | | | |
|---|---|---|---|
| 5,134,719 A | 7/1992 | Mankovitz | |
| 5,333,275 A | 7/1994 | Wheatley et al. | |
| 5,437,050 A | 7/1995 | Lamb et al. | |
| 5,465,240 A | 11/1995 | Mankovitz | |
| 5,649,060 A | 7/1997 | Ellozy et al. | |
| 5,674,743 A | 10/1997 | Ulmer | |
| 5,740,230 A | 4/1998 | Vaudreuil | |
| 5,918,223 A | 6/1999 | Blum et al. | |
| 5,952,597 A | 9/1999 | Weinstock et al. | |
| 6,107,559 A | 8/2000 | Weinstock et al. | |
| 6,166,314 A | 12/2000 | Weinstock et al. | |
| 6,476,306 B2 | 11/2002 | Huopaniemi et al. | |
| 6,766,523 B2 | 7/2004 | Herley | |
| 6,792,007 B1 | 9/2004 | Hamada et al. | |
| 6,911,592 B1 | 6/2005 | Futamase | |
| 6,966,065 B1 | 11/2005 | Kitazato et al. | |
| 6,990,453 B2 | 1/2006 | Wang et al. | |
| 7,174,293 B2 | 2/2007 | Kenyon | |
| 7,190,971 B1 | 3/2007 | Kawamoto | |
| 7,194,752 B1 | 3/2007 | Kenyon et al. | |
| 7,277,766 B1 | 10/2007 | Khan et al. | |
| 7,333,864 B1 | 2/2008 | Herley | |
| 7,444,353 B1 | 10/2008 | Chen et al. | |
| 7,461,392 B2 | 12/2008 | Herley | |
| 7,523,474 B2 | 4/2009 | Herley | |
| 7,549,052 B2 | 6/2009 | Haitsma et al. | |
| 7,627,477 B2 | 12/2009 | Wang | |
| 7,653,921 B2 | 1/2010 | Herley | |
| 2002/0072982 A1 | 6/2002 | Barton et al. | |
| 2002/0083060 A1 | 6/2002 | Wang et al. | |
| 2003/0231868 A1* | 12/2003 | Herley ............... H04H 60/37 386/250 |
| 2004/0266337 A1 | 12/2004 | Radcliffe et al. | |
| 2005/0086682 A1 | 4/2005 | Burges et al. | |
| 2005/0267817 A1 | 12/2005 | Barton et al. | |
| 2006/0106867 A1* | 5/2006 | Burges ............. G06F 17/30026 |
| 2006/0112812 A1 | 6/2006 | Venkataraman et al. | |
| 2006/0122839 A1 | 6/2006 | Wang et al. | |
| 2006/0246408 A1 | 11/2006 | Gao | |
| 2007/0016918 A1* | 1/2007 | Alcorn .............. G06F 17/30743 725/22 |
| 2007/0143777 A1 | 6/2007 | Wang | |
| 2007/0166683 A1 | 7/2007 | Chang et al. | |
| 2008/0097754 A1 | 4/2008 | Goto et al. | |
| 2008/0115655 A1 | 5/2008 | Weng et al. | |
| 2008/0196575 A1 | 8/2008 | Good | |
| 2008/0263360 A1 | 10/2008 | Haitsma et al. | |
| 2009/0083281 A1 | 3/2009 | Sarig et al. | |
| 2010/0050853 A1 | 3/2010 | Jean et al. | |
| 2010/0145708 A1 | 6/2010 | Master et al. | |
| 2010/0211693 A1 | 8/2010 | Master et al. | |
| 2010/0247060 A1 | 9/2010 | Gay et al. | |
| 2010/0268359 A1 | 10/2010 | Prestenback et al. | |
| 2011/0276157 A1 | 11/2011 | Wang et al. | |
| 2012/0029670 A1 | 2/2012 | Mont-Reynaud et al. | |
| 2012/0239175 A1 | 9/2012 | Mohajer et al. | |
| 2014/0316787 A1 | 10/2014 | Wang et al. | |

OTHER PUBLICATIONS

Vy et al., "EnACT: A software tool for creating animated text captions", ICCHP 2008, LNCS 5105, pp. 609-616 (2008).

Geleijnse et al., "Enriching Music with Synchronized Lyrics, Images, and Colored Lights", Ambi-Sys'08, Feb. 11-14, 2008, Quebec, Canada.

Shi-Kuo Chang, Zen Chen, Suh-Yin Lee / Oostveen, J., et al., "Recent Advances in Visual Information Systems", 5th International Conference, Visual 2002, "Feature Extraction and a Database Strategy for Video Fingerprinting", Lecture Notes in Computer Science, 2314, (Mar. 11, 2002), 117-128.

Macrae et al., "MuViSync: Realtime Music Video Alignment", available from http://www.xavieranguera.com/papers/icme2010.pdf, at least on Dec. 2, 2010.

Kan et al., "LyricAlly: Automatic Synchronization of Textual Lyrics to Acoustic Music Signals", IEEE Transactions on Audio, Speech and Language Processing, vol. 16, No. 2, Feb. 2008, pp. 338-349.

Mesaros, "Automatic Alignment of Music Audio and Lyrics", Proc. of the 11th Int. Conference on Digital Audio Effects (DAFx-08), Espoo, Finland, Sep. 1-4, 2008, pp. DAFX-1-4.

Young et al., The HTK Book (for HTK Version 3.4), first published Dec. 1995.

Fujihara et al., "Three Techniques for Improving Automatic Synchronization Between Music and Lyrics: Fricative Detection, Filler Model, and Novel Feature Vectors for Vocal Activity Detection", National Institute of Advanced Industrial Science and Technology, 2008, pp. 69-72.

Fujihara et al., "Automatic Synchronization Between Lyrics and Music CD Recordings based on Viterbi Alignment of Segragated Vocal Signals", Proceedings of the Eighth IEEE International Symposium on Multimedia, 2006.

http://waltdisneyworldflorida.net/walt-disney-news/walt-disney-tron-bambi-to-employ-disneys-second-screen-technology-on-dvd-blu-ray/, visited and printed from internet May 4, 2011.

http://www.razorianfly.com/2011/02/12/details-on-tron-legacy-for-blu-ray-surface-disneys-second-screen-for-ipad/, visited and printed from internet on May 4, 2011.

International Search Report and Written Opinion prepared by the European Patent Office in International Patent Application PCT/US2011/035254, dated Aug. 29, 2011.

International Preliminary Report on Patentability and Written Opinion prepared by the European Patent Office in International Patent Application PCT/US2011/035254, dated Nov. 15, 2012.

\* cited by examiner

METHODS AND SYSTEMS FOR PROCESSING A SAMPLE OF A MEDIA STREAM

CROSS-REFERENCE TO RELATED APPLICATION

The present application is a continuation of U.S. patent application Ser. No. 13/101,051, filed on May 4, 2011, which claims priority to U.S. Provisional Patent Application Ser. No. 61/331,015, filed on May 4, 2010 and also claims priority to U.S. Provisional Patent Application Ser. No. 61/444,458, filed on Feb. 18, 2011, and the entire contents of each of these cross-referenced applications are all herein incorporated by reference.

FIELD

The present disclosure relates to media processing including media information retrieval, synchronization of media, and verification of an identification of media. In addition, the present disclosure relates to false positive detections, multiple version disambiguations, determination of matching segment lengths, and resynchronization of media streams.

BACKGROUND

Content identification systems for various media types, such as audio or video, use many different methods. A client device may capture a media sample recording of a media stream (such as radio), and may then perform a search in a database of media recordings (also known as media tracks) for a match to identify the media stream. The sample recording could be preprocessed on the client device to extract relevant features for content identification. The sample recording may be passed to a content identification module, which can perform content identification of the sample and return a result of the identification to the client device. A recognition result may then be displayed to a user on the client device or used for various follow-on services, such as purchasing or referencing related information. Other applications for content identification include broadcast monitoring or content-sensitive advertising, for example.

In example content identification systems, the content identification may be concluded after a result is returned to the client device. Some content identification systems, however, may have low discriminability, which may result in a number of false positive matches. In addition, some content identification systems may not disambiguate between multiple possible matching recordings in the database. For example, if the sample recording spans a segment shared by multiple target recordings in the database, the content identification system may determine that any of these multiple recordings is a match. This situation could arise if there are multiple versions of a media recording, such as for example, a radio mix, an extended dance mix, or a mash-up, in which segments from the same original recording are sampled into different works. In these example cases, a result of a content identification may be incorrect.

SUMMARY

In one example, the present disclosure describes a method comprising receiving a sample of a media stream rendered by a media rendering source. The method also comprises for matching media recordings from which the sample was obtained, receiving a signature file including a temporally mapped collection of features describing content of the matching media recordings. The method further comprises storing each received signature file in memory.

In one example, the method may further comprise receiving a content identification query including the sample of the media stream rendered by a media rendering source, and determining identifications of the matching media recordings from which the sample was obtained.

In one example, the method may further comprise receiving a signature stream including features extracted from the media stream, determining a number of matching features between the signature stream of the media stream and the signature file for at least one matching media recording, and based on the number of matching features identifying a matching media recording.

In one example, the method may further comprise receiving a signature stream including features extracted from the media stream, and determining whether features between the signature stream of the media stream and the signature file for at least one matching media recording are substantially matching over time. The method may further comprise when substantially matching features between the signature stream of the media stream and the signature file for a matching media recording stop occurring, identifying a discontinuity.

The method may be performed by a client device or by a server, for example.

Any of the methods described herein may be provided in a form of instructions stored on a non-transitory, computer readable medium, that when executed by a computing device, perform functions of the method. Further embodiments may also include articles of manufacture including a tangible computer-readable media that have computer-readable instructions encoded thereon, and the instructions may comprise instructions to perform functions of the methods described herein.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in processes or methods described herein.

In another example, a system is described that comprises an input interface configured to receive a sample of a media stream rendered by a media rendering source, and a continuity tracker configured to receive, for matching media recordings from which the sample was obtained, a signature file including a temporally mapped collection of features describing content of the matching media recordings.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
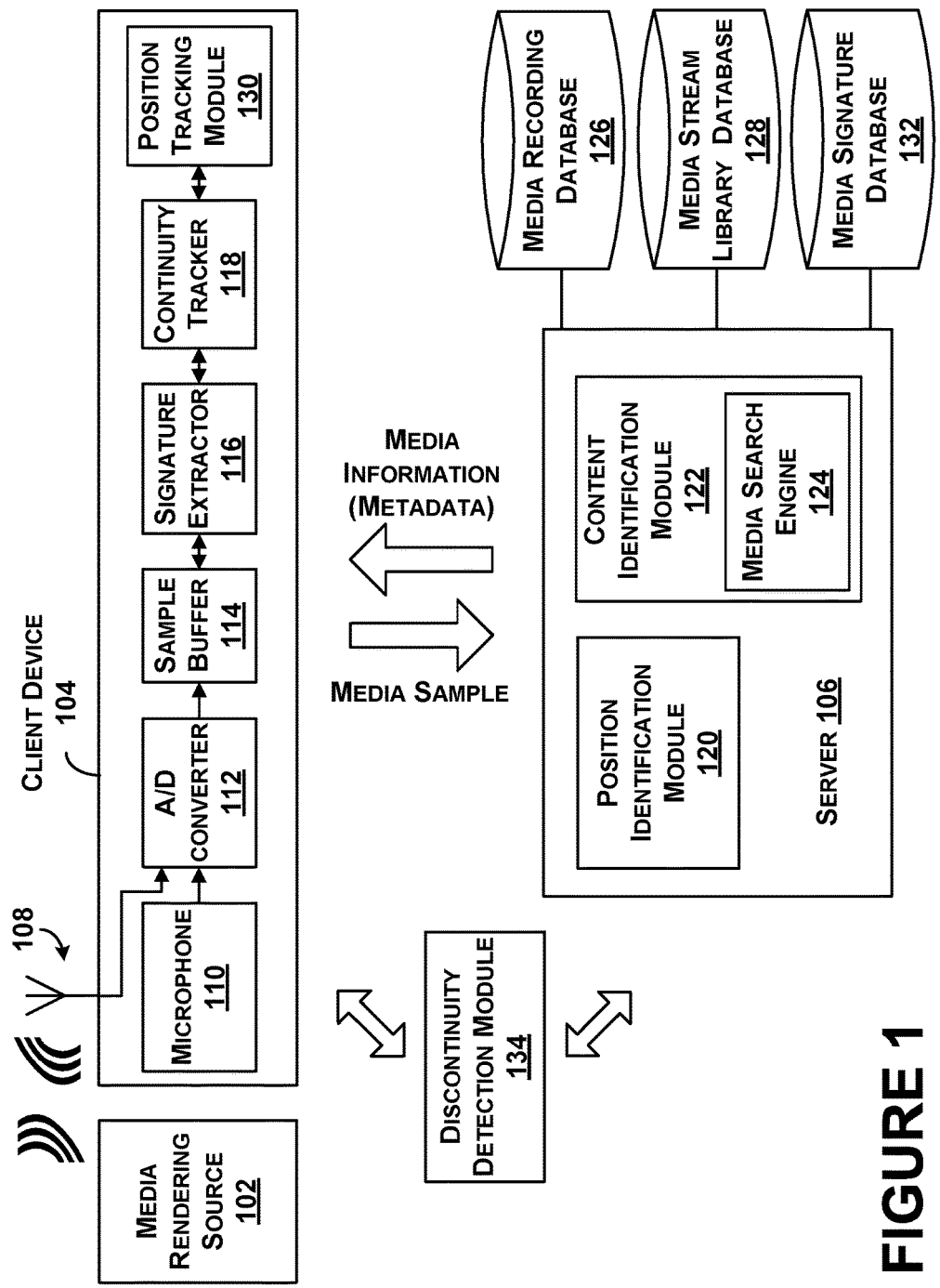
FIG. 1 illustrates one example of a system for identifying media content, and performing verification of the identification.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure may describe, inter alia, methods and systems for processing a sample of a media stream are provided. In one example, a method includes receiving a sample of a media stream rendered by a media rendering source, and for matching media recordings from which the sample was obtained, the method also includes receiving a signature file including a temporally mapped collection of features describing content of the matching media recordings. Each received signature file may be stored in memory. In addition, a signature stream may be received that includes features extracted from the media stream, and a number of matching features between the signature stream of the media stream and the signature file for at least one matching media recording can be determined. In one example, when substantially matching features between the signature stream of the media stream and the signature file for a matching media recording stop occurring, a discontinuity can be identified.

In examples described below, methods and systems enable verification of a matching result returned from a content identification so as to correct a false positive, and remove a need to perform further computationally expensive content identifications for additional increments of captured media samples from a media stream. Example methods and systems may also enable disambiguating between multiple versions of a media recording, and managing synchrony between a master media stream and a group of slave media streams.

Example methods and systems may be performed by providing a content identification of a media sample from a media stream, and for each identified media recording providing a corresponding feature-extracted signature file derived from the media recording. A corresponding feature-extracted signature stream can be extracted from the media stream starting from portions of the media stream in the vicinity of the original media sample. Time offset positions within each identified media recording can be determined, and a corresponding time position within the corresponding signature file for each identified media recording can be initially aligned to the corresponding time offset within the media stream. Due to the alignment of the features between the signature stream of the media stream and the signature file of each identified media recording, matching features in the media stream may be expected at corresponding times in each identified media stream. When feature correspondences at expected locations stop occurring, a discontinuity can be flagged. A discontinuity may trigger an action to occur, such as flagging a false positive, for example.

Verification of continuity may be computationally inexpensive because a small number of features can be used to compare at expected locations. A signature file used to verify an entire full-length musical recording can be less than about 5 KB, for example. Thus, a verification library could be stored on a client device or pushed over a network.

In examples described herein, methods and systems for verifying content identification may be completed by performing separate queries to a content identification server. However, to avoid additional queries (which may add extra load to the identification server module), verification of continuity may be performed using signature files.

I. Overview of Example Systems

Referring now to the figures, FIG. 1 illustrates one example of a system for identifying media content, and performing verification of the identification. The system includes a media rendering source 102, a client device 104, and a server 106. One or more of the described functions or components of the system in FIG. 1 may be divided up into additional functional or physical components, or combined into fewer functional or physical components. For example, there may be no client 104 and server 106 separation as the system may be used as a verification mechanism for recognition, or be completely self-contained in an integrated portable user device. In some further examples, additional functional and/or physical components may be added to the examples illustrated by FIG. 1.

The media rendering source 102 renders and presents media content from a media stream in real time in any known manner. The media stream may be stored on the media rendering source 102 as a recording or received from external sources, such as an analog or digital broadcast. In one example, the media rendering source 102 may be a radio station or a television content provider that broadcasts media streams (e.g., audio and/or video) and/or other information.

The media rendering source 102 may also be any type of device that plays audio media, displays video media in a recorded or live format. In an alternate embodiment, the media rendering source 102 may include a live performance as a source of audio and/or a source of video, for example. The media rendering source 102 may render or present the media stream through a graphical display, audio speakers, a MIDI musical instrument, an animatronic puppet, etc., or any other kind of presentation provided by the media rendering source 102, for example.

The client device 104 receives a rendering of the media stream from the media rendering source 102 through a sample capture module encompassing a media receiver 108. In FIG. 1, the media receiver 108 is shown to be an antenna, and the media rendering source 102 broadcasts the media stream wirelessly to the client device 104. However, depending on a form of the media stream, the media rendering source 102 may render the media using wireless or wired communication techniques. In other examples, the client device 104 includes a microphone 110 to receive the media stream or recording from the media rendering source 102. The client device 104 can also include any of a video camera, vibration sensor, radio receiver, network interface, etc., to receive the media stream.

The client device 104 may not be operationally coupled to the media rendering source 102, other than to receive the rendering of the media stream. In this manner, the client device 104 may not be controlled by the media rendering source 102, and the client device 104 may not be an integral portion of the media rendering source 102. In the example shown in FIG. 1, the client device 104 is a separate entity from the media rendering source 102.

The client device 104 can be implemented as a portion of a small-form factor portable (or mobile) electronic device such as a cell phone, a wireless cell phone, a personal data assistant (PDA), a personal media player device, a wireless web-watch device, a personal headset device, an application specific device, or a hybrid device that include any of the above functions. The client device 104 can also be implemented as a personal computer including both laptop computer and non-laptop computer configurations. The client device 104 can also be a component of a larger device or system as well.

The client device 104 may be operated to capture a media sample of the rendered media stream. This may occur automatically without user intervention or may be effected by a user activating a button or other application to trigger the sample capture. For example, a user of the client device 104 may press a button to record a ten second digital sample of audio through a microphone, or to capture a still image or video sequence using a camera. As other examples, the client device 104 may receive a signal with instructions to capture a media sample, or the client device 104 may autonomously detect environmental activity (e.g., via a voice activity or music activity detection module) and responsively capture a media sample.

Media samples of a continuous media stream may be captured by the antenna 108 or microphone 110, passed through an analog to digital (A/D) converter 112, and stored in a rolling media sample buffer 114 (e.g., such as a circular or ring buffer or queue). Old media samples may be retired as new samples are captured so that a history of a certain length backwards in time is available for analysis. Alternatively, the media samples may be captured directly from a digital feed, or as shown, may be sampled from the A/D converter 112. The media stream may be ambient free-field audio, and the media samples may be digitized pulse code modulation (PCM) samples captured from the microphone 110 at an 8 KHz sampling rate, for example. (The term "sample" herein may be considered both individual samples, such as PCM audio sample values, as well as a collection of such samples over a segment of time, for example.)

A time stamp corresponding to a sampling time of the media sample is recorded as $T_0$ and may be referred to as the synchronization point. The sampling time may preferably be the beginning, but could also be an ending, middle, or any other predetermined time of the media sample. Thus, the media samples may be time-stamped so that a corresponding time offset within the media stream from a fixed arbitrary reference point in time is known. The time-stamping may be explicit, in which each media sample may have an associated time value, or implicit, in which the time may be determined from the sample's position within the sample buffer 114 or from a number of sample periods elapsed since the reference time point, for example. The reference time could be defined as a moment the client device 104 is turned on and the first media sample is captured, for example.

Media samples can be obtained from the media sample buffer 114 and passed to the sever 106 for content identification. In another example, the media samples could be preprocessed and feature-extracted before sending to the server 106. For instance, the media samples can be sent to a signature extractor 116 to generate a signature stream of extracted features, and each feature may have a corresponding time position within the media stream. The signature stream of extracted features can be provided to a continuity tracker 118 that may compare the signature stream of extracted features to a received signature file for a corresponding media recording to determine validity/continuity of a received content identification.

A signature file may be a temporally mapped collection of features describing content of a media recording that has a temporal dimension corresponding to a timeline of the media recording, and each feature may be a description of the content in a vicinity of each mapped timepoint. A signature file may be predetermined based on media recordings and stored, and a signature stream may be determined and generated in real-time based on an observed media stream, for example. Generally, the features can be chosen to be reproducible in the presence of noise and distortion, for example. The features may be extracted sparsely at discrete time positions, and each feature may correspond to a feature of interest. Examples of sparse features include $L_p$ norm power peaks, spectrogram energy peaks, linked salient points, etc. For more examples, the reader is referred to U.S. Pat. No. 6,990,453, by Wang and Smith, which is hereby entirely incorporated by reference.

Alternatively, a continuous time axis could be represented densely, in which every value of time has a corresponding feature value. Examples of such dense features include feature waveforms (as described in U.S. Pat. No. 7,174,293 to Kenyon, which is hereby entirely incorporated by reference), spectrogram bitmap rasters (as described in U.S. Pat. No. 5,437,050, which is hereby entirely incorporated by reference), an activity matrix (as described in U.S. Publication Patent Application No. 2010/0145708, which is hereby entirely incorporated by reference), and an energy flux bitmap raster (as described in U.S. Pat. No. 7,549,052, which is hereby entirely incorporated by reference).

In one example, a signature file includes a sparse feature representation. The features may be obtained from a spectrogram extracted using overlapped short-time Fast Fourier Transforms (FFT). Peaks in the spectrogram can be chosen at time-frequency locations where a corresponding energy value is a local maximum. For examples, peaks may be selected by identifying maximum points in a region surrounding each candidate location. A psychoacoustic masking criterion may also be used to suppress inaudible energy peaks. Each peak can be coded as a pair of time and frequency values. Additionally, an energy amplitude of the peaks may be recorded. In one example, an audio sampling rate is 8 KHz, and an FFT frame size may vary between about 64-1024 bins, with a hop size between frames of about 25-75% overlap with the previous frame. Increasing a frequency resolution may result in less temporal accuracy. Additionally, a frequency axis could be warped and interpolated onto a logarithmic scale, such as mel-frequency.

A number of features or information associated with the features may be combined into a signature file. A signature file may order features as a list arranged in increasing time. Each feature $F_j$ can be associated with a time value $t_j$ in a data construct, and the list can be an array of such constructs; here j is the index of the j-th construct, for example. In an example using a continuous time representation, e.g., successive frames of a spectrogram, the time axis could be implicit in the index into the list array. For convenience, the time axis within each media recording can be obtained as an offset from a beginning of the recording, and thus time zero refers to the beginning of the recording.

A size of a resulting signature file may vary depending on a feature extraction method used. In one example, a density of selected spectrogram peaks (e.g., features) may be chosen to be about between 10-50 points per second. The peaks can be chosen as the top N most energetic peaks per unit time, for example, the top 10 peaks in a one-second frame. In an example using 10 peaks per second, using 32 bits to encode each peak frequency (e.g., 8 bits for the frequency value and 24 bits to encode the time offset), 40 bytes per second may be required to encode the features. With an average song length of about three minutes, a signature file size of approximately 7.2 kilobytes may result for a song. For other signature encoding methods, for example, a 32-bit feature at every offset of a spectrogram with a hop size of 100 milliseconds, a similar size fingerprint results.

In another example, a signature file may be on the order of about 5-10 KB, and may correspond to a portion of a media recording from which a sample was obtained that is about 20 seconds long and refers to a portion of the media recording after an end of a captured sample.

Thus, the signature extractor 116 may extract features from a media sample, using any of the methods described herein, to generate a signature stream of extracted features. The continuity tracker 118 may receive a predetermined signature file for a corresponding media recording, and the continuity tracker 118 may compare the extracted signature stream of extracted features to the signature file, as described below.

The client device 104 may be operated to capture portions of the media sample rendered by the media rendering source 102 for identification, and send the captured portion to the server 106 for identification. The client device 104 may be operationally coupled to the server 106 through a wired or wireless interface.

The server 106 may include a position identification module 120 and a content identification module 122. Although FIG. 1 illustrates the server 106 to include both the position identification module 120 and the content identification module 122, either of the position identification module 120 and/or the content identification module 122 may be separate entities apart from the server 106, for example. Alternatively, both the position identification module 120 and the content identification module 122 may be the same entity, or functions of the position identification module 120 and the content identification module 122 may be performed by the same entity. In addition, the position identification module 120 and/or the content identification module 122 may be located in the client device 104 or may be on a remote server connected to the client device 104 over a network, as shown in FIG. 1.

The server 106 may receive a media sample from the client device 104 (either over a wired or wireless connection), and the position identification module 120 may identify a corresponding estimated time position ($T_S$) indicating a time offset of the media sample into the media stream (or media recording) based on the media sample that is captured at that moment. $T_S$ may also, in some examples, be an elapsed amount of time from a beginning of the media stream.

The content identification module 122 may optionally also perform a content identification on the received media sample. The content identification may identify content in a media stream, e.g., a musical soundtrack, if the identity is not already known. The content identification module 122 may be used or be incorporated within any of example media sample information retrieval systems, such as provided by Shazam Entertainment in London, United Kingdom, Gracenote in Emeryville, Calif., or Melodis in San Jose, Calif., for example. These services operate to receive samples of environmental audio, identify a musical content of the audio sample, and provide the user with information about the music, including the track name, artist, album, artwork, biography, discography, concert tickets, etc.

In this regard, the content identification module 122 may include a media search engine 124 and may include or have access to a media recording database 126 that indexes reference media content objects and recordings, for example, musical soundtracks, video clips, movies, and television shows, to compare the received media sample with the stored information so as to identify media content within the received media sample. Once a media object within the media stream has been identified, identity information and other metadata may be reported back to the client device 104.

Metadata may also comprise data and hyperlinks to other related content and services, including recommendations, ads, offers to preview, bookmark, and buy musical recordings, videos, concert tickets, and bonus content; as well as to facilitate browsing, exploring, discovering related content on the world wide web.

Alternatively, the client device 104 may capture a sample of a media stream from the media rendering source 102, and perform initial feature extraction processing on the sample so as to create a fingerprint of the media sample. The client device 104 could then send the fingerprint information to the position identification module 120 and/or the content identification module 122, which may identify information pertaining to the sample based on the fingerprint information alone. In this manner, more computation or identification processing can be performed at the client device 104, rather than at the position identification module 120 and/or the content identification module 122, for example.

As mentioned, the media recording database 126 may include many media content objects, each of which may be identified by a unique identifier (e.g., sound_ID). The database 126 may not necessarily store actual media content, such as audio or video files for each recording, since the sound_IDs can be used to retrieve the files from elsewhere. However, the database 126 may store media content files in some embodiments. A media content database index may be very large, containing indices for millions or even billions of files, for example. New content can be added incrementally to the database index.

The database 126 may also include information for each stored audio, video, or media file, or for each stored media index. For example, metadata may be stored with each file that indicates information about the file, such as an artist name, a length of song, lyrics of the song, time indices for lines or words of the lyrics, album artwork, or any other identifying or related information to the file.

The system of FIG. 1 allows time offsets of captured media samples to be identified, and also for media samples to be identified based on stored information. While FIG. 1 illustrates a system that has a given configuration, the components within the system may be arranged in other manners. For example, the media search engine 124 may be separate from the content identification module 122, or media sample processing can occur at the client 104 or at the server 106. Thus, it should be understood that the configurations described herein are merely exemplary in nature, and many alternative configurations might also be used.

The system in FIG. 1, and in particular the position identification module 120, may identify time offsets of media samples within a media stream. Optionally, the system can be used to identify content in a media stream using samples of the media within the media stream using the content identification module 122.

Various media sample identification techniques are known in the art for performing computational content identifications of media samples and features of media samples using a database of media content objects. The following U.S. patents and publications describe possible examples for media recognition techniques, and each is entirely incorporated herein by reference, as if fully set forth in this description: Kenyon et al, U.S. Pat. No. 4,843,562, entitled "Broadcast Information Classification System and Method"; Kenyon, U.S. Pat. No. 4,450,531, entitled "Broadcast Signal Recognition System and Method"; Haitsma et al, U.S. Patent Application Publication No. 2008/0263360, entitled "Generating and Matching Hashes of Multimedia Content"; Wang and Culbert, U.S. Pat. No. 7,627,477, entitled "Robust and Invariant Audio Pattern Matching"; Wang, Avery, U.S. Patent Application Publication No. 2007/0143777, entitled "Method and Apparatus for Identification of Broadcast Source"; Wang and Smith, U.S. Pat. No. 6,990,453, entitled "System and Methods for Recognizing Sound and Music Signals in High Noise and Distortion"; and Blum, et al, U.S. Pat. No. 5,918,223, entitled "Method and Article of Manufacture for Content-Based Analysis, Storage, Retrieval, and Segmentation of Audio Information".

Briefly, identifying a media recording begins by receiving a media recording and sampling the media recording. The recording is correlated with digitized, normalized reference signal segments to obtain correlation function peaks for each resultant correlation segment, providing a recognition signal when the spacing between the correlation function peaks is within a predetermined limit, and a pattern of RMS power values coincident with the correlation function peaks matches within predetermined limits of a pattern of the RMS power values from the digitized reference signal segments, as noted in U.S. Pat. No. 4,450,531, for example. The matching media content is thus identified. Furthermore, the matching position of the media recording in the media content is given by the position of the matching correlation segment, as well as the offset of the correlation peaks, for example.

In another example, generally, media content can be identified by identifying or computing characteristics or fingerprints of a media sample and comparing the fingerprints to previously identified fingerprints. The particular locations within the sample at which fingerprints are computed depend on reproducible points in the sample. Such reproducibly computable locations are referred to as "landmarks." A location within the sample of the landmarks can be determined by the sample itself, i.e., is dependent upon sample qualities and is reproducible. That is, the same or similar landmarks may be computed for the same signal each time the process is repeated. A landmarking scheme may mark about 5 to about 10 landmarks per second of sound recording; however, landmarking density depends on an amount of activity within the media recording. One landmarking technique, known as Power Norm, is to calculate an instantaneous power at many time points in the recording and to select local maxima. One way of doing this is to calculate an envelope by rectifying and filtering a waveform directly. Another way is to calculate a Hilbert transform (quadrature) of a signal and use a sum of magnitudes squared of the Hilbert transform and the original signal. Other methods for calculating landmarks may also be used.

Once the landmarks have been computed, a fingerprint is computed at or near each landmark time point in the recording. A nearness of a feature to a landmark is defined by the fingerprinting method used. In some cases, a feature is considered near a landmark if the feature clearly corresponds to the landmark and not to a previous or subsequent landmark. In other cases, features correspond to multiple adjacent landmarks. The fingerprint is generally a value or set of values that summarizes a set of features in the recording at or near the time point. In one embodiment, each fingerprint is a single numerical value that is a hashed function of multiple features. Other examples of fingerprints include spectral slice fingerprints, multi-slice fingerprints, LPC coefficients, cepstral coefficients, and frequency components of spectrogram peaks.

Fingerprints can be computed by any type of digital signal processing or frequency analysis of the signal. In one example, to generate spectral slice fingerprints, a frequency analysis is performed in the neighborhood of each landmark timepoint to extract the top several spectral peaks. A fingerprint value may then be the single frequency value of a strongest spectral peak. For more information on calculating characteristics or fingerprints of audio samples, the reader is referred to U.S. Pat. No. 6,990,453, to Wang and Smith, entitled "System and Methods for Recognizing Sound and Music Signals in High Noise and Distortion," the entire disclosure of which is herein incorporated by reference as if fully set forth in this description.

Thus, the content identification module 122 may receive a sample and compute fingerprints of the sample. The content identification module 122 may compute the fingerprints by communicating with additional recognition engines. To identify the recording, the content identification module 122 can then access the media recording database 126 to match the fingerprints of the sample with fingerprints of known audio tracks by generating correspondences between equivalent fingerprints and files in the media recording database 126 to locate a file that has the largest number of linearly related correspondences, or whose relative locations of characteristic fingerprints most closely match the relative locations of the same fingerprints of the sample. That is, linear correspondences between the landmark pairs are identified, and sets are scored according to the number of pairs that are linearly related. A linear correspondence may occur when a statistically significant number of corresponding sample locations and file locations can be described with substantially the same linear equation, within an allowed tolerance, for example. The file of the set with the highest statistically significant score, i.e., with a largest number of linearly related correspondences, is the winning file, and is deemed the matching media file.

As yet another example of a technique to identify content within the media stream, a media sample can be analyzed to identify its content using a localized matching technique. For example, generally, a relationship between two media samples can be characterized by first matching certain fingerprint objects derived from the respective samples. A set of fingerprint objects, each occurring at a particular location, is generated for each media sample. Each location is determined depending upon the content of a respective media sample and each fingerprint object characterizes one or more local features at or near the respective particular location. A relative value is next determined for each pair of matched fingerprint objects. A histogram of the relative values is then generated. If a statistically significant peak is found, the two media samples can be characterized as substantially matching. Additionally, a time stretch ratio, which indicates how much an audio sample has been sped up or slowed down as compared to the original audio track can be determined. For a more detailed explanation of this method, the reader is referred to U.S. Pat. No. 7,627,477, to Wang and Culbert, entitled Robust and Invariant Audio Pattern Matching, the entire disclosure of which is herein incorporated by reference as if fully set forth in this description.

In addition, systems and methods described within the publications above may return more than just the identity of a media sample. For example, using the method described in U.S. Pat. No. 6,990,453 to Wang and Smith may return, in addition to metadata associated with an identified audio track, a relative time offset (RTO) of a media sample from a beginning of an identified sample, referred to as an estimated identified media stream position $T_S$. To determine a relative time offset of the recording, fingerprints of the sample can be compared with fingerprints of the original files to which the fingerprints match. Each fingerprint occurs at a given time, so after matching fingerprints to identify the sample, a difference in time between a first fingerprint (of the matching fingerprint in the sample) and a first fingerprint of the stored original file will be a time offset of the sample, e.g., amount of time into a song. Thus, a relative time offset (e.g., 67 seconds into a song) at which the sample was taken can be determined. Other information may be used as well to determine the RTO. For example, a location of a histogram peak may be considered the time offset from a beginning of the reference recording to the beginning of the sample recording.

Other forms of content identification may also be performed depending on a type of the media sample. For example, a video identification algorithm may be used to identify a position within a video stream (e.g., a movie). An example video identification algorithm is described in Oostveen, J., et al., "Feature Extraction and a Database Strategy for Video Fingerprinting", Lecture Notes in Computer Science, 2314, (Mar. 11, 2002), 117-128, the entire contents of which are herein incorporated by reference. For example, a position of the video sample into a video can be derived by determining which video frame was identified. To identify the video frame, frames of the media sample can be divided into a grid of rows and columns, and for each block of the grid, a mean of the luminance values of pixels is computed. A spatial filter can be applied to the computed mean luminance values to derive fingerprint bits for each block of the grid. The fingerprint bits can be used to uniquely identify the frame, and can be compared or matched to fingerprint bits of a database that includes known media. The extracted fingerprint bits from a frame may be referred to as sub-fingerprints, and a fingerprint block is a fixed number of sub-fingerprints from consecutive frames. Using the sub-fingerprints and fingerprint blocks, identification of video samples can be performed. Based on which frame the media sample included, a position into the video (e.g., time offset) can be determined Furthermore, other forms of content and/or position identification may also be performed, such as using watermarking methods. A watermarking method can be used by the position identification module 120 to determine the time offset such that the media stream may have embedded watermarks at intervals, and each watermark specifies a time or position of the watermark either directly, or indirectly via a database lookup, for example. Alternatively, if the media stream includes embedded watermarks that indicate, either directly or indirectly, a time or position offset value, the client device 104 may determine the time offset of a sample of the media being rendered without communication with the position identification module 120.

In each of the foregoing example content identification methods for implementing functions of the content identification module 122, a byproduct of the identification process may be a time offset of the media sample within the media stream (e.g., estimated identified media stream position $T_S$). Thus, in these cases, the position identification module 120 may be the same as the content identification module 122, or functions of the position identification module 120 may be performed by the content identification module 122.

Thus, a user may send from the client device 104 a position identification query to the position identification module 120, which may use any of the techniques described herein to return information relating to the content to the client device 104, and optionally, the content identification module 122 may be accessed to identify the content. Example embodiments described herein apply to any type of media stream, such as for example, pre-recorded or live music, audio, video, a combination of audio and video, or any other kind of media or event sequences that follow a timeline of positions in the media stream. Example embodiments also apply to any format of the media stream such as, for example, media on CDs, DVDs, compressed digital media, MIDI files, animation sequences, control sequences, scripts, slide shows, etc.

In other examples, the client device 104 or the server 106 may further access a media stream library database 128 to select a media stream corresponding to the sampled media that may then be returned to the client device 104 to be rendered by the client device 104. The media stream library database 128 may be located in the client device 104 or in the server 106, or alternatively either or both of the client device 104 and the server 106 may be connected to the media stream library database 128 over a network. In FIG. 1, the media stream library database 128 is shown to be connected to the server 106, for example. Still further, information in the media stream library database 128, or the media stream library database 128 itself, may be included within the media recording database 126.

A media stream in the media stream library database 128 corresponding to the media sample may be manually selected by a user of the client device 104, programmatically by the client device 104, or selected by the server 106 based on an identity of the media sample determined by the content identification module 122, for example. The selected media stream may be a different kind of media from the media sample, and may be synchronized to the media being rendered by the media rendering source 102. For example, the media sample may be music, and the selected media stream may be lyrics, a musical score, a guitar tablature, musical accompaniment, a video, animatronic puppet dance, an animation sequence, etc., which can be synchronized to the music. The selected media stream may be determined based on a content identification of the media sample, for example.

In some examples, the selected media stream may be lyrics corresponding to an identified media stream. The selected media stream may alternatively be any type of media stream, such as movies, a soundtrack, lyrics, text, video clips, pictures, slideshow, documents, etc. In still further examples, the media stream may be a video stream, and the selected media stream may be a soundtrack of the video stream. In addition, or as an alternative, the media stream may be a soundtrack, and the selected media stream may be a movie. In yet another embodiment, the selected media stream may be an alternative version of a first media stream, for example a version in different language. Or the selected media stream could be at a different resolution than a first media stream, for example, High Definition or 7.1-channel surround sound, such that by synchronizing the selected media stream, a higher quality version of the first media stream may be provided.

The client device 104 may receive the selected media stream corresponding to the media sample, and may render the selected media stream in synchrony with the media being rendered by the media rendering source 102.

An estimated time position of the media being rendered by the media rendering source 102 can be determined by the position identification module 120 and can be used to determine a corresponding position within the selected media stream at which to render the selected media stream. The client device 104 can then render and present the selected media stream in synchrony with the media being rendered by the media rendering source 102.

The client device 104 may include a position tracking module 130 to ensure accurate synchronization between the two media streams. When the client device 104 is triggered to capture a media sample, a timestamp ($T_0$) is recorded from a reference clock of the client device 104. At any time t, an estimated real-time media stream position $T_r(t)$ is determined from the estimated identified media stream position $T_S$ received from the server 106 plus elapsed time since the time of the timestamp:

$$T_r(t)=T_S+t-T_0 \qquad \text{Equation (1)}$$

$T_r(t)$ is an elapsed amount of time from a reference point, such as a beginning of the media stream, to a real-time position of the media stream as is currently being rendered. Thus, using $T_S$ (i.e., the estimated elapsed amount of time from a beginning of the media stream to a position of the media stream based on the recorded sample), the $T_r(t)$ can be calculated. $T_r(t)$ can then be used by the client device 104 to present the selected media stream in synchrony (or substantially in synchrony) with the media being rendered by the media rendering source 102. For example, the client device 104 may begin rendering the selected media stream at the time position $T_r(t)$, or at a position such that $T_r(t)$ amount of time has elapsed.

The position tracking may fall out of synchrony for many reasons. In one instance, the media stream may be rendered by the media rendering source 102 at an unexpected speed. For example, if a musical recording is being played on an uncalibrated turntable or CD player, the music recording could be played faster or slower than an expected reference speed, or in a manner differently from the stored reference media stream. Or, sometimes a DJ may change a speed of a musical recording intentionally to achieve a certain effect, such as matching a tempo across a number of tracks. In such instances, the estimated position $T_r(t)$ can become incorrect as t increases, and consequently, the selected media stream may be out of sync. As examples of reference speeds, a CD player is expected to be rendered at 44100 samples per second; a 45 RPM vinyl record is expected to play at 45 revolutions per minute on a turntable; and an NTSC video stream is expected to play at 60 frames per second.

In some embodiments, to mitigate or prevent the selected media stream from falling out of synchrony with the media being rendered by the media rendering source 102, the estimated position $T_r(t)$ can be adjusted according to a speed adjustment ratio R. For example, methods described in U.S. Pat. No. 7,627,477, entitled "Robust and invariant audio pattern matching", the entire contents of which are herein incorporated by reference, can be performed to identify the media sample, the estimated identified media stream position $T_S$, and a speed ratio R.

To estimate the speed ratio R, cross-frequency ratios of variant parts of matching fingerprints are calculated, and because frequency is inversely proportional to time, a cross-time ratio is the reciprocal of the cross-frequency ratio. A cross-speed ratio R is the cross-frequency ratio (e.g., the reciprocal of the cross-time ratio).

More specifically, using the methods described above, a relationship between two audio samples can be characterized by generating a time-frequency spectrogram of the samples (e.g., computing a Fourier Transform to generate frequency bins in each frame), and identifying local energy peaks of the spectrogram. Information related to the local energy peaks is extracted and summarized into a list of fingerprint objects, each of which optionally includes a location field, a variant component, and an invariant component. Certain fingerprint objects derived from the spectrogram of the respective audio samples can then be matched. A relative value is determined for each pair of matched fingerprint objects, which may be, for example, a quotient or difference of logarithm of parametric values of the respective audio samples.

In one example, local pairs of spectral peaks are chosen from the spectrogram of the media sample, and each local pair comprises a fingerprint. Similarly, local pairs of spectral peaks are chosen from the spectrogram of a known media stream, and each local pair comprises a fingerprint. Matching fingerprints between the sample and the known media stream are determined, and time differences between the spectral peaks for each of the sample and the media stream are calculated. For instance, a time difference between two peaks of the sample is determined and compared to a time difference between two peaks of the known media stream. A ratio of these two time differences can be determined and a histogram can be generated comprising such ratios (e.g., extracted from matching pairs of fingerprints). A peak of the histogram may be determined to be an actual speed ratio (e.g., ratio between the speed at which the media rendering source 102 is playing the media compared to the reference speed at which a reference media file is rendered). Thus, an estimate of the speed ratio R can be obtained by finding a peak in the histogram, for example, such that the peak in the histogram characterizes the relationship between the two audio samples as a relative pitch, or, in case of linear stretch, a relative playback speed.

Alternatively, a relative value may be determined from frequency values of matching fingerprints from the sample and the known media stream. For instance, a frequency value of an anchor point of a pair of spectrogram peaks of the sample is determined and compared to a frequency value of an anchor point of a pair of spectrogram peaks of the media stream. A ratio of these two frequency values can be determined and a histogram can be generated comprising such ratios (e.g. extracted from matching pairs of fingerprints). A peak of the histogram may be determined to be an actual speed ratio R. In equations, $$R_f = \frac{f_{sample}}{f_{stream}} \qquad \text{Equation (2)}$$

where $f_{sample}$ and $f_{stream}$ are variant frequency values of matching fingerprints, as described by Wang and Culbert, U.S. Pat. No. 7,627,477, the entirety of which is hereby incorporated by reference.

Thus, the global relative value (e.g., speed ratio R) can be estimated from matched fingerprint objects using corresponding variant components from the two audio samples. The variant component may be a frequency value determined from a local feature near the location of each fingerprint object. The speed ratio R could be a ratio of frequencies or delta times, or some other function that results in an estimate of a global parameter used to describe the mapping between the two audio samples. The speed ratio R may be considered an estimate of the relative playback speed, for example.

The speed ratio R can be estimated using other methods as well. For example, multiple samples of the media can be captured, and content identification can be performed on each sample to obtain multiple estimated media stream positions $T_S(k)$ at reference clock time $T_0(k)$ for the k-th sample. Then, R could be estimated as:

$$R_k = \frac{T_S(k) - T_S(1)}{T_0(k) - T_0(1)} \qquad \text{Equation (3)}$$

To represent R as time-varying, the following equation may be used:

$$R_k = \frac{T_S(k) - T_S(k-1)}{T_0(k) - T_0(k-1)} \qquad \text{Equation (4)}$$

Thus, the speed ratio R can be calculated using the estimated time positions $T_S$ over a span of time to determine the speed at which the media is being rendered by the media rendering source 102.

Using the speed ratio R, an estimate of the real-time media stream position can be calculated as:

$$T_r(t) = T_S + R(t - T_0) \qquad \text{Equation (5)}$$

The real-time media stream position indicates the position in time of the media sample. For example, if the media sample is from a song that has a length of four minutes, and if $T_r(t)$ is one minute, that indicates that the one minute of the song has elapsed.

In other examples, the client device 104 or the server 106 may further access a media signature database 132 to obtain a signature file or a media recording (e.g., a song). As described, a signature file may include a temporally mapped collection of features describing content of a media recording that has a temporal dimension corresponding to a timeline of the media recording, and each feature may be a description of the content in a vicinity of each mapped timepoint. Example signature files of songs may be about 5 kilobytes to about 10 kilobytes in size. The media signature database 132 may include a signature file for a number of media recordings, and may continually be updated to include signature files for new media recordings. In one example, the media signature database 132 may include a signature file for each of the media recordings identified in the media recording database 126 or in the media stream library database 128, for example.

In response to a content identification query received from the client device 104, the server 106 may access one or more of the media recording database 126 to identify a media recoding from which the media sample was obtained, the media stream library database 128 to select a media stream corresponding to the media sample, and the media signature database 132 to retrieve a signature file corresponding to identified media recording. The server 106 may then return any of such information to the client device 104.

In an example in which the signature file of the identified media recording is returned to the client device 104, the continuity tracker 118 of the client device 104 may use the signature file to verify identification of captured media samples at a future time. For example, the continuity tracker 118 may compare alignment of the features within the media sample and the signature file to identify matching features in the media sample at corresponding times. When feature correspondences at expected locations stop occurring, a discontinuity can be flagged. The discontinuity may trigger an action to occur, as described below.

The client device may store samples of the media stream in the sample buffer 114. While a comparison of the features with the media sample and the signature file is performed, new samples may be received and stored in the buffer 114 as time progresses.

The system in FIG. 1 may further include a discontinuity detection module 134 separate from the client device 104 and/or the server 106 that communicates with the client device 104 and/or the server 106 using wireless or wired communication techniques, for example. In another example, functions of the discontinuity detection module 134 may optionally be performed by components of the client device 104 (e.g., the continuity tracker 118) and/or components of the server 106, for example.

The discontinuity detection module 134 may detect if the media stream being rendered by the media rendering source 102 is interrupted unexpectedly. This may occur, for example, if a channel is changed on the media rendering source 102, or if someone stops playout of the media stream or skips to a different position in the media stream. If the selected media stream from the media stream library database 128 were to continue to play, the two media streams would be out of sync or disconnected. The discontinuity detection module 134 may either stop the selected media stream or attempt to resynchronize the two media streams.

Thus, the discontinuity detection module 134 may verify whether the selected media stream is being rendered in synchrony with the media stream being rendered by the media rendering source 102.

The discontinuity detection module 134 functions may be implemented by performing periodic position and/or content identification samplings as outlined above as an example method to calculate the speed ratio R, and thus, the discontinuity detection module 134 may communicate with the server 106. Alternatively, the discontinuity detection module 134 may communicate with the server 106 or access the media signature database 132 to retrieve signature files of identified media recordings to perform verifications of the media streams rendered by the media rendering source 102. If at some point, content identifications are no longer successful or the signature file does not include matching features with the media stream, the media stream being rendered by the media rendering source 102 has stopped or been interrupted. Or, if a different media stream is identified then perhaps a channel changed, a new track is being played, etc.

To determine discontinuities in a media stream being rendered by the media rendering source 102, the discontinuity detection module 134 can periodically receive media samples from the client device 104 and perform fingerprint extraction on the media samples. The discontinuity detection module 134 may also receive information from the position identification module 120 including the signature file that includes a number of fingerprints of the reference media stream throughout the media stream. The discontinuity detection module 134 may then compare the extracted fingerprints from the periodically received media samples to the fingerprints in the signature file to determine if the media stream being rendered by the media rendering source 102 has been interrupted. The discontinuity detection module 134 will anticipate certain fingerprints to appear in the samples at predetermined times, and if the expected fingerprints are not seen, then a discontinuity may be determined. For example, if a certain amount of time has passed with no predetermined fingerprint matches, then a discontinuity can be determined. When no identifiable fingerprint matches are found, the discontinuity detection module 134 may determine that the media stream has been interrupted or ended.

Fingerprint matching can also be performed using, for example, methods described above, or as described in U.S. Pat. No. 6,990,453, to Wang and Smith.

Upon determining a type of discontinuity, the discontinuity detection module 134 can do one of several things. In one example, based on detection of a speed drift, the discontinuity detection module 134 can make an adjustment to the speed ratio R so as to perform a resynchronization of the media streams. In another example, based on detection of a large discontinuity, the discontinuity detection module 134 can use the position identification module 120 to realign the media streams so as to perform a resynchronization of the media streams. In still another example, the discontinuity detection module 134 can use the content identification module 122 to detect a new media stream and choose a different matched media stream and a new position within the new stream for synchronization. In yet another example, if position and/or content identifications fail, the discontinuity detection module 134 can instruct the client device 104 to stop rendering the selected media.

The client device 104 may receive a notification from the discontinuity detection module 134 and then stop displaying the selected media stream or change to display a new media stream selected from the media stream library database 128 synchronized to the new media stream being rendered from the media rendering source 102, for example.

The discontinuity detection module 134 may alternatively thus perform or instruct the client device 104 to perform updates on alignment of the selected media from the media stream library database 128 with the media being rendered by the media rendering source 102. The discontinuity detection module 134 may determine, based on a misalignment of fingerprint matches with the signature file, an offset value at which to adjust the rendering of the selected media on the client device 104 so that the selected media is realigned and synchronized with the rendering of the media stream by the media rendering source 102.

Alternatively, if the discontinuity detection module 134 no longer identifies matching fingerprints from the periodically received media samples to the fingerprints in the signature file, the discontinuity detection module 134 may inform the client device 104 to perform a resynchronization of the selected media from the media stream library database 128 with the media being rendered by the media rendering source 102. To do so, the client device 104 may re-perform the method of capturing a new sample of the media and sending the new sample to the position identification module 120 to determine the time offset.

Still, alternatively, based on the continued absence of fingerprint matches, the discontinuity detection module 134 may determine that the media stream is no longer being rendered, for example if the position detection module 120 detects no matching time offset, and thus, may instruct the client device 104 to stop rendering the selected media or to perform a new content identification, for example. The client device 104 may send the new sample to the content identification module 122 to identify a new media stream being rendered by the media rendering source 102. If the identified media stream has changed then the client device 104 may select a new media stream from the media stream library database 128 corresponding to the media sample to be rendered in synchrony by the client device 104.

II. Signature Database

Figure 2:
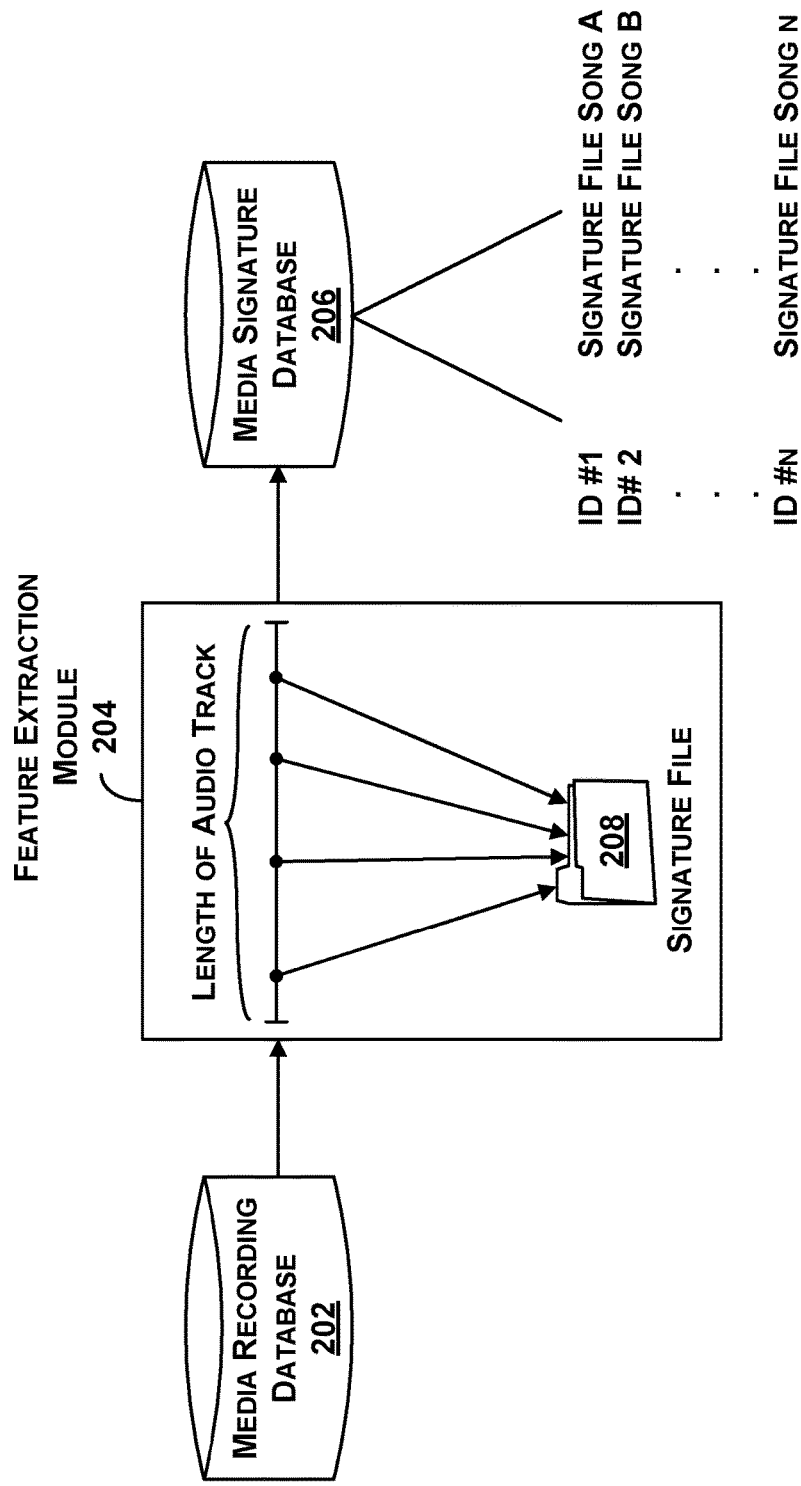
FIG. 2 illustrates an example system to prepare a signature database.

FIG. 2 illustrates an example system to prepare a signature database. The system includes a media recording database 202, a feature extraction module 204, and a media signature database 206.

The media recording database 202 may include a number of copies of media recordings (e.g., songs or videos) or references to a number of copies of the media recordings. The feature extraction module 204 may be coupled to the media recording database 202 and may receive the media recordings for processing. FIG. 2 conceptually illustrates the feature extraction module receiving an audio track from the media recording database 202.

The feature extraction module 204 may extract features from the media recording, using any of the example methods described above, to generate a signature file 208 for the media recording. The feature extraction module 204 may store the signature file 208 in the media signature database 206. The media signature database 206 may store signature files with an associated identifier, as shown in FIG. 2, for example.

Generation of the signature files may be performed in a batch mode and a library of reference media recordings can be preprocessed into a library of corresponding feature-extracted reference signature files, for example. Media recordings input to the feature extraction module 204 may be stored into a buffer (e.g., where old recordings are sent out of a rolling buffer and new recordings are received). Features may be extracted and a signature file may be created continuously from continuous operation of the rolling buffer of media recordings so as to represent no gaps in time, or in an on-demand basis as needed. In the on-demand example, the feature extraction module 204 may retrieve media recordings as necessary out of the media recording database 202 to extract features in response to a request for corresponding features.

In one example, features used by the server 106 in FIG. 1 for content identification and recognition may be the same or different than the features extracted by the feature extraction module 204 for the signature file. In one example, the features extracted by the feature extraction module 204 and features used by the server 106 in FIG. 1 for content identification may be the same, and the server 106 may access extracted features by the feature extraction module 204 to perform a content identification.

In one example, the resulting library of reference signature files can then be stored into the media signature database 206 to be retrieved as part of a return result packet to a content identification query.

III. Overview of Example Methods

Figure 3:
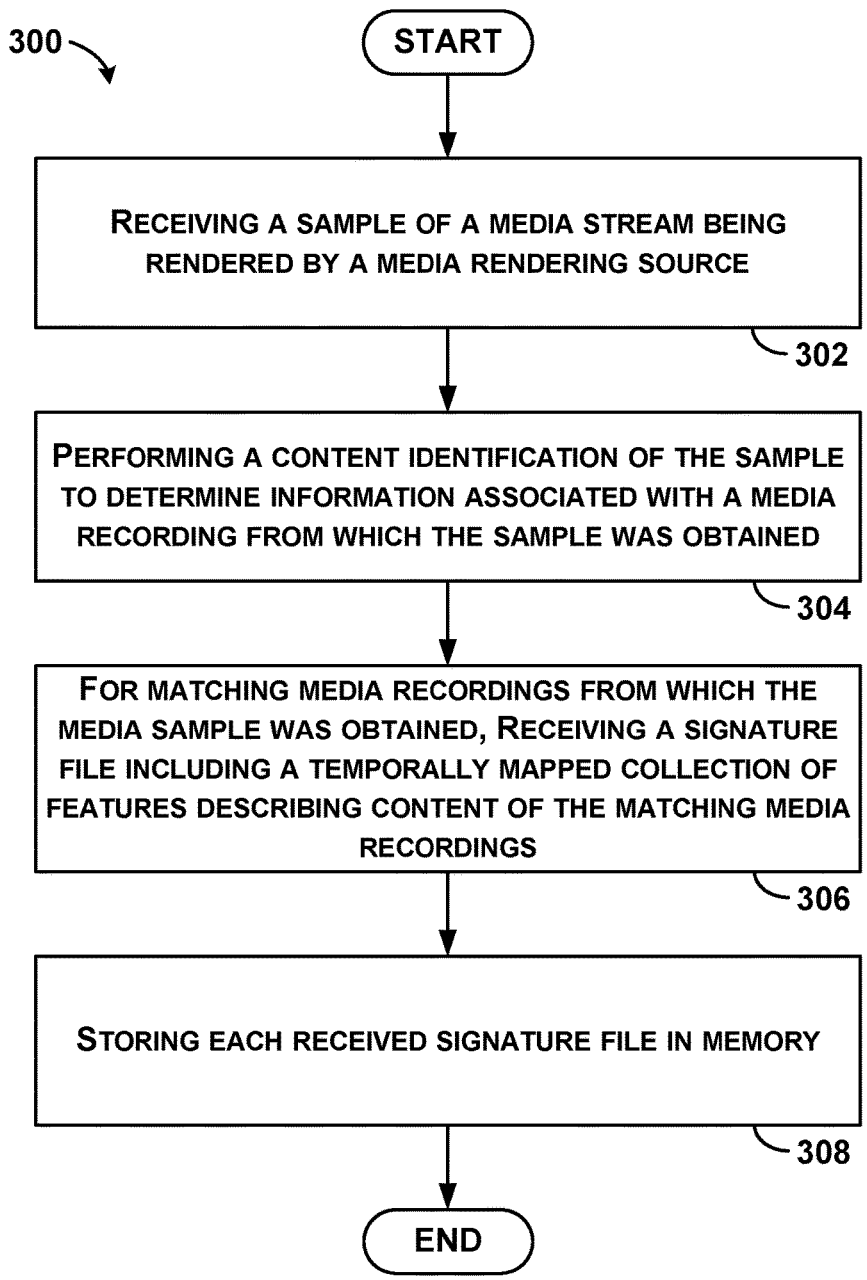
FIG. 3 is a block diagram of an example method to process samples of media, in accordance with at least some embodiments described herein.

FIG. 3 is a block diagram of an example method to process samples of media, in accordance with at least some embodiments described herein. Method 300 shown in FIG. 3 presents an embodiment of a method that, for example, could be used with the system shown in FIG. 1 or FIG. 2, for example, and may be performed by a computing device (or components of a computing device) such as a client device or a server. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of article of manufacture including a tangible computer-readable media, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving a media sample of a media stream being rendered by a media rendering source. For example, a client device may receive a sample of media of an ambient environment using an input interface, such as a microphone.

As another example, a server may receive a sample of media from a client device. In this example, a client device may capture the sample of media from media being rendered in an ambient environment and send the sample to the server. The sample may be sent within a content identification query to the server to request an identification of the media from which the sample was captured.

At block 304, the method 300 includes performing a content identification of the sample to determine information associated with a media recording from which the sample was obtained. For example, a client device or a server may perform a content identification using any of the methods described above. In addition, a client device may perform a content identification by sending a content identification query to a server.

At block 306, the method 300 includes for matching media recordings from which the sample was obtained, receiving a signature file including a temporally mapped collection of features describing content of the matching media recordings. For example, a client device may receive the signature file from memory of the client device (which may store a number of signature files), a media signature database (e.g., as described in FIG. 2), and/or from a server. In a particular example, the client device may send the sample to the server in a content identification query, and the server may return information associated with a media recording from which the sample was obtained and the signature file of the identified media recording. As another example, a server may receive the signature file from the media signature database.

The matching media recordings may be determined based on a result of the content identification performed at block 304. More than one media recording may be found to match the sample, for example, in an instance in which the sample is a portion of the media stream and that portion matches to multiple versions of a corresponding media recording (e.g., a remix of the song, an original of the song, etc.). A signature file for each of the matching media recordings can be provided to the client device and/or the server.

In one example, the server may determine a group of candidate identification results matching the sample, and may return to the client device a reference identifier for each identification result, a time offset $T_{s,k}$ corresponding to an offset of the sampling time (e.g., beginning) of the sample within the reference recording, and optionally a speed skew ratio $R_k$, wherein k is the k-th candidate result. For each candidate reference recording identified in the group, a corresponding reference signature file can be retrieved from the signature database using the reference identifier and returned to the client device.

At block 308, the method 300 includes storing each received signature file in memory. For example, the client device and/or the server may store a received signature file in memory for later use.

Figure 4:
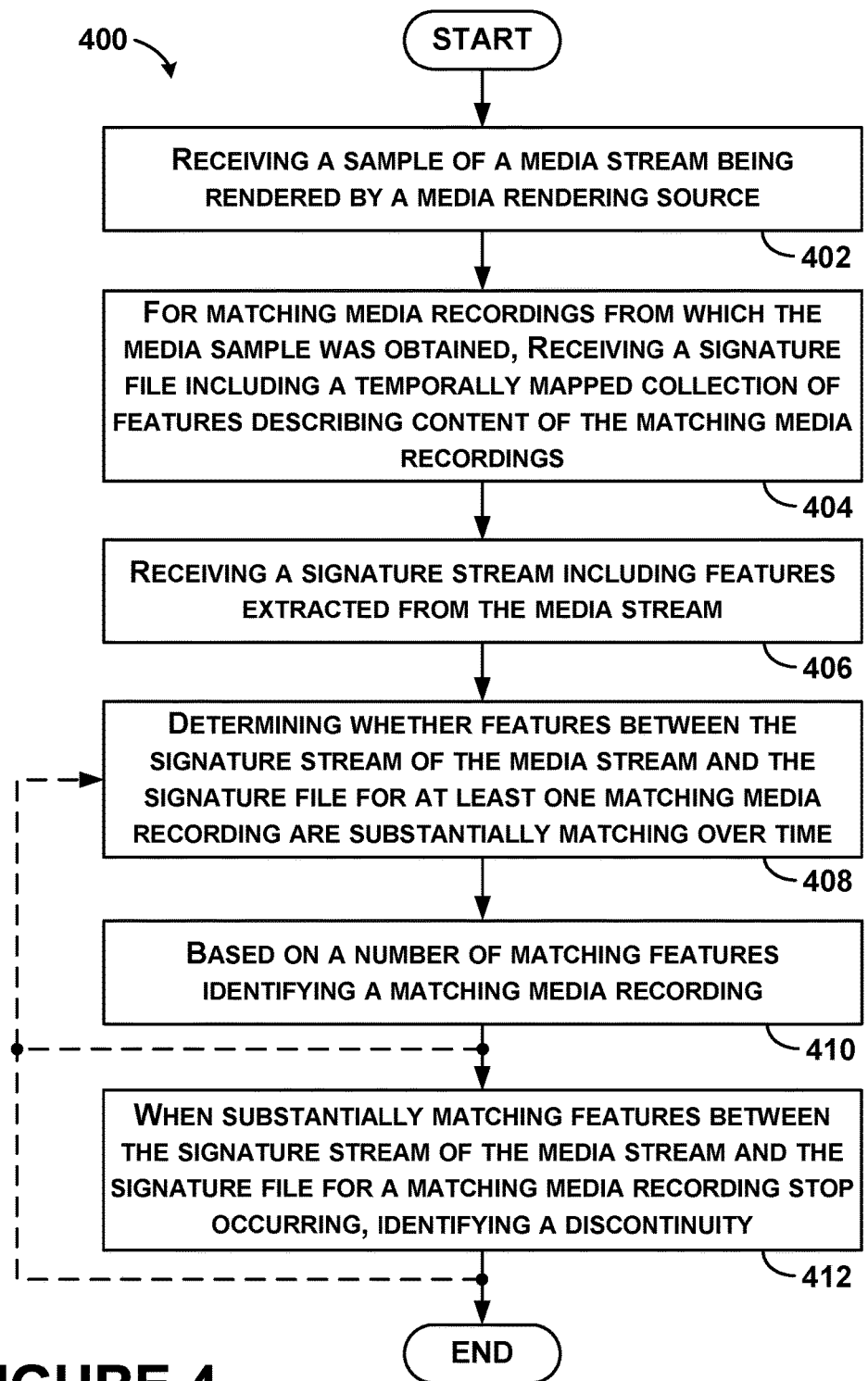
FIG. 4 is a block diagram of another example method to process samples of media, in accordance with at least some embodiments described herein.

FIG. 4 is a block diagram of another example method to process samples of media, in accordance with at least some embodiments described herein. Method 400 shown in FIG. 4 presents an embodiment of a method that, for example, could be used with the system shown in FIG. 1 or FIG. 2, for example, and may be performed by a device (or components of the device) or by a server. Method 400 may include one or more operations, functions, or actions as illustrated by one or more of blocks 402-412. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 402, the method 400 includes receiving a media sample of a media stream being rendered by a media rendering source. For example, a client device or a server may receive a sample of a media stream as described above in FIG. 3.

At block 404, the method 400 includes for matching media recordings from which the sample was obtained, receiving a signature file including a temporally mapped collection of features describing content of the matching media recordings. For example, a client device or a server may receive the signature file as described above in FIG. 3.

At block 406, the method 400 includes receiving a signature stream including features extracted from the media stream. For example, a client device may receive via an input interface (e.g., microphone) incremental samples of the media stream, and may extract features of these samples to generate corresponding signature stream increments. Each incremental sample may include content at a time after a previous sample, as the media stream rendered by the media rendering source may have been ongoing. The client device may send corresponding increments of the signature stream to a server so that the server may receive the signature stream, for example. Alternatively, the client device may send corresponding increments of the signature stream to a continuity tracker module 118 so that the continuity tracker module 118 may receive the signature stream, for example.

The signature stream may be generated based on samples of the media stream using any of the methods described above for extracting features of a sample, for example.

The signature stream may be generated in an ongoing basis in realtime when the media stream is an ongoing media stream. In this manner, features in the signature stream may increase in number over time.

At block 408, the method 400 includes determining whether features between the signature stream of the media stream and the signature file for at least one matching media recording are substantially matching over time. For example, the client device or the server may compare the features in the signature stream with features in each of the received signature files. The features can be compared by aligning a time position within the signature file for each matching media recording to a time offset ($T_{s,k}$) corresponding to an offset of a sampling time (e.g. beginning) of the sample within the k-th matching media recording, and then comparing the aligned signature file for each matching media recording with the signature stream, which may be generated from incremental portions of the media stream in a vicinity of the sample. In this way, the features of the signature file that are expected to correspond to features in the signature stream can be compared as the media stream is received in realtime.

Figure 5:
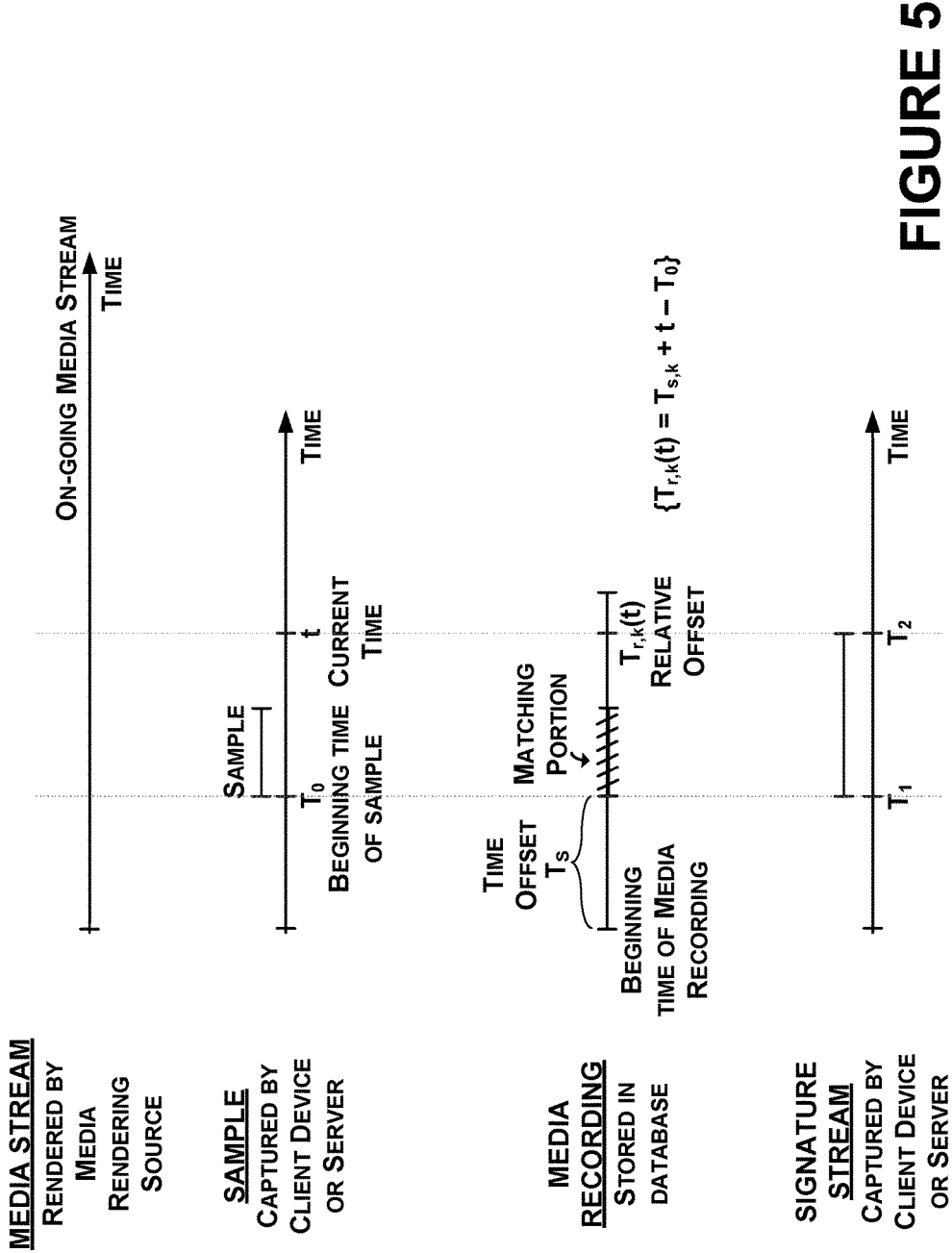
FIG. 5 illustrates an example timing diagram.

FIG. 5 illustrates an example timing diagram. In one example, an on-going media stream may be rendered by a media rendering source over time. A sample of the media stream may be captured or obtained by the client device or the server at a time $T_0$. The sample may be any length, such as for example, about 5-10 seconds in length. A content identification may be performed on the sample to identify a media recording from which the sample was obtained (e.g., to identify the media recording being rendered within the media stream). The media recording may be stored in a database, as described in FIG. 1, and the sample can be compared to stored recordings to identify a matching portion of a stored recording. A signature stream may also be captured by the client device or the server. The signature stream may comprise features extracted from the media stream over time, and thus, the signature stream may include features extracted within a time segment (T1, T2). A time T1 may correspond to the time $T_0$ at which the sample was obtained. The signature stream may be continually generated such that time T2 is close to or equivalent to the current time t. The signature stream may be stored in a buffer, such as a first in first out (FIFO) buffer, in which older features are removed after a predetermined amount of time (e.g., after about 5-10 minutes).

In one example, the signature stream may be generated from a portion of the media stream starting at time $T_0$ at which the sample was obtained. To extend a region for comparison purposes, a time segment (T1, T2) can be selected and portions of the signature stream within this time segment can be compared to features in the signature file at a corresponding time segment. The time segment ($T_1, T_2$) may include portions of a segment between a synchronization point ($T_0$) up to a fullest extent of the signature stream that is available (e.g., based on an ongoing rendering of the media stream). For example, if the media stream is captured in realtime from a microphone or digital broadcast receiver, an upper bound of $T_2$ may be the current realtime. A lower bound of $T_1$ may be an oldest extent backwards in time for which the signature stream has been buffered. Any subset of the available buffered time range may be taken as the time segment ($T_1, T_2$) to be scanned, for example.

For a k-th candidate reference signature file, $$T_{r,k}(t) = T_{s,k} + t - T_0 \qquad \text{Equation (6)}$$

or if speed compensation is used $$T_{r,k}(t) = T_{s,k} + R_k*(t - T_0) \qquad \text{Equation (7)}$$

where $T_0$ is a timestamp indicating a time that the sample was recorded, $T_{r,k}(t)$ is a relative time offset of content within the k-th matching media recording corresponding to content of the media stream at time t, $T_{s,k}$ is a time offset of a sampling time (e.g. beginning) of the sample within the k-th matching media recording, and $R_k$ is a timescale ratio that indicates a speed at which the media stream is rendered by the media rendering source based on a reference speed of the media recordings. In some example, $R_k=1$ if no such value was provided or if no speed compensation is needed. When $t=T_0$, $T_{r,k}(T_0)=T_{s,k}$ at a point of synchronization $T_0$, which results from synchronization at time $t=T_0$ may be known as a result of a content identification.

For a given time segment ($T_1, T_2$), a set of features $F_j$ with corresponding times $t_j$ such that $T_1 < t_j < T_2$ can be retrieved from the signature stream. The client device or the server may determine, within the aligned signature file, whether a feature ($F'_{j,k}$) substantially similar to $F_j$ occurs at a time ($t'_{j,k}$) substantially similar to $T_{r,k}(t_j) = T_{s,k} + R_k*(t_j - T_0)$. The client device or the server may determine a match when $F'_{j,k}$ is within a predetermined deviation from $F_j$ and the $t'_{j,k}$ is within a predetermined deviation from $T_{r,k}(t_j)$.

Thus, for each segment ($T_1, T_2$) selected to be scanned, a set of features F with corresponding times $t_j$ such that $T_1 < t_j < T_2$ is retrieved from the signature stream. If a feature $F_j$ occurs at time $t_j$ within the signature stream, and if the k-th candidate reference signature file matches the signature stream at time then within the corresponding reference signature file a substantially similar feature $F'_{j,k}$ would be expected to occur at a time $t'_{j,k}$ that is substantially similar to $T_{r,k}(t_j) = T_{s,k} + R_k*(t_j - T_0)$. A match is considered to occur when $F'_{j,k}$ is within a predetermined deviation from $F_j$ and the $t'_{j,k}$ is within a predetermined deviation from $T_{r,k}(t_j)$. In one example, for the time dimension $$|t'_{j,k} - T_{r,k}(t_j)| = |t'_{j,k} - T_{s,k} + R_k^*(t_j - T_0)| < \delta_t \qquad \text{Equation (8)}$$

where $\delta_t$ is a time tolerance value (e.g., the time symbols t, $t_j$, $T_0$, $T_1$, $T_2$ occur in time coordinates of the media stream, while the symbols $T_{r,k}$, $T_{s,k}$, and $t'_{m,k}$ occur in time coordinates of the k-th candidate reference signature file). An example value of the time tolerance $\delta_t$ may be about 10 milliseconds to about 100 milliseconds.

In one example, if the features $F_j$ are scalar values then $$|F_j - F'_{j,k}| < \delta_F \qquad \text{Equation (9)}$$

where $\delta_F$ is a feature tolerance value. An example of a scalar feature is the frequency of a spectrogram peak, and examples of values for the feature tolerance value ($\delta_F$) include about 5 Hz to about 20 Hz.

In one example, if the features are non-scalar objects then a suitable distance metric may be evaluated, such as $$D(F_j, F'_{j,k}) < \delta_F \qquad \text{Equation (10)}$$

An example non-scalar feature may include a vector of linked spectrogram peak coordinates that has two or three frequency values, as described by Wang and Smith in U.S. Pat. No. 6,990,453 (entirely incorporated by reference). In such a case, a distance metric may be a Euclidean distance metric determined from frequency coordinates. Another example of a non-scalar feature includes a spectrogram peak bitmap raster, as described by Haitsma in U.S. Patent Application Publication No. 2008/0263360 (entirely incorporated by reference). In these cases, a number of common bits can be calculated and features may be considered to be matching if a predetermined threshold number of matching bits is obtained, in which case the metric $D(F_j, F'_{j,k})$ may be maximized rather than minimized.

Referring back to FIG. 4, at block 410, the method 400 includes based on the number of matching features, identifying a matching media recording. For example, the client device or the server may be configured to determine a number of matching features between the signature stream of the media stream and the signature file for at least one matching media recording, and rank the number of matching features for each signature file. A signature file that has a highest number of matching features may be considered a match, and a media recording that is identified by or referenced to by the signature file may be identified as a matching recording from which the sample was obtained.

In one example, block 408 may optionally be repeated after block 410, such that features between the signature stream and the signature files can be repeatedly compared. When a matching $F'_{j,k}$ and $t'_{j,k}$ are found in an expected location in the k-th candidate reference signature file, evidence supporting continued synchronization of a successful matching media recording is accumulated. A location of each match over the segment ($T_1$, $T_2$) may be stored. Accumulation of evidence may be processed within the segment ($T_1$, $T_2$) or in aggregate with results from processing earlier segments.

To process within the segment ($T_1$, $T_2$), a score for the segment may be incremented for each match found, for example, and a total number of matches may be determined. This method may be used if a granularity of the segment were of a size similar to a desired granularity of determination of synchronization. For example, if a desired time resolution of synchronization were about 500 ms then buffers may capture portions of the media stream about every 500 ms and then analyzed to count a number of matching features. An aggregate score may be determined from counts from all the segments.

Another example method of accumulating evidence in either the segment ($T_1$, $T_2$) or the aggregated results may be to prepare a density map. For example, locations of matches may be convolved with a density kernel to arrive at a density map. Yet another method of accumulating evidence may be to observe a location of a latest feature match time in either ($T_1$, $T_2$) or the aggregated results. A feature count, matching length, or density may be interpreted as a score. A quality of a match may also be taken into account. If a distance metric in time or in feature space has a high value then a contribution to the score could be weighted inversely according to the distance, i.e., a poorer match would result in a lower score contribution. Many other methods for evaluating a pattern of matching features are possible as well.

Generally, any pattern, subset, or sequence of time segments out of the signature stream may be used to test, track, and extend a known extent of continuity of synchronization against a reference signature file. Each segment that is scanned may increase knowledge of how well the features in the signature stream (and hence features in the media stream) match the features in the k-th reference signature file. An aggregate result of segment verification can be used to provide a map of the extent of synchrony on a timeline corresponding to time coordinates of the media stream or the reference signature file.

In one example, for each candidate signature file, a verification may be performed with ($T_1$, $T_2$) for the signature stream chosen to extend forwards and/or backwards by a predetermined amount of time. If a signature stream buffer extends far enough backwards in time, $T_1$ may be chosen to correspond to a sampling time (e.g., a beginning) of a signature file, otherwise an earliest available time in the signature stream buffer may be chosen. Similarly, $T_2$ may be chosen to correspond to an end of the reference signature file or a latest available time (e.g., a current time). In one example, some time may have elapsed after an end of the sample and before a content identification has returned a result, and thus, additional samples could be captured and additional features could be extracted and stored into the signature stream buffer so that $T_2$ may be beyond the end of the sample segment up until the corresponding end of the candidate reference signature file.

In another example, evaluation may be delayed for a predetermined amount of time after an end of the sample segment to allow further samples to be collected for verification. For instance, a sample segment for a content identification may be about five seconds long. The time $T_2$ may be set to be five more seconds after an end of the sample segment. Furthermore, time T1 may be set to be about 10 seconds previous to $T_0$, for an aggregate time segment of about 20 seconds. Thus, 20 seconds of signature stream may be compared against up to about 20 seconds of each candidate reference signature file to verify a match with each one.

In another example, verification may be performed with a time segment (T1,T2) chosen to span an expected extent of the corresponding reference signature file. The k-th candidate reference signature file may indicate a length $L_k$ of the corresponding reference media recording. The length $L_k$ and the time offset $T_{s,k}$ may enable the determination for the segment (T1,T2):

$$T_1 = T_0 - T_{s,k}/R_k \qquad \text{Equation (11)}$$

$$T_2 = T_0 + (L_k - T_{s,k})/R_k \qquad \text{Equation (12)}$$

where T1 corresponds to the expected beginning of the reference media recording in the media stream, and T2 corresponds to the expected end time. In this manner, an entire length of the reference media recording may be verified, for example. The T1 and T2 values may be distal limits and may be adjusted subject to an available buffered portion of the signature stream. Any subset of (T1,T2) could also be used. Taking the length into account allows a more precise sample segment to be chosen in which feature matching is expected along the entire length, for example.

In still another example, verification of an identified media stream may be performed in realtime for continuity using adjacent and incremental time segments to iteratively scan the signature stream as the time segments become available. For example, one-second time increments may be chosen starting from $T_0$ up until a current realtime, and verification may be performed by iterating over the signature stream whenever an additional full buffer period of the signature stream has been collected. In an alternate example, if a first iteration is initiated at some time after $T_0$, a catch-up scanning step may be performed from a start point up to the available current realtime position, and then one-second iterative time increments may be used after the catch-up. For example, a given starting point may be $T_0$. Another possible starting point may be a predicted start point of the reference media recording (to which a signature file refers) within the media stream. This may occur when $T_{r,k}(t)=0$, i.e., $t=T_0-T_{s,k}/R_k$. Thus, time segments for verification may also span backwards in time from a synchronization point $T_0$.

Referring again to FIG. 4, at block 412, the method 400 includes when substantially matching features between the signature stream of the media stream and the signature file for a matching media recording stop occurring, identifying a discontinuity. In one example, the client device or the server may continually compare the signature files to the updating signature stream, and when matches between features stop occurring, a discontinuity between the identified media recording and the media stream can be flagged. In one example, substantially matching features may stop occurring when a density of matching features falls below a predetermined threshold over time, or if no more matching features are found. A threshold amount of time delay, for example about 2-5 seconds beyond a last known point of synchrony (at a matching feature), may be used to take into account a possibility that a matching media recording may be obscured by noise that temporarily overwhelms the signal. A last known point of synchrony can be considered to be an endpoint of a matching portion. Synchronization for the k-th candidate reference media recording (based on a corresponding signature file) can be considered to end when a point in the signature stream corresponding to an end of the k-th reference signature file is reached. When synchrony is considered to be lost for the k-th candidate signature file, the k-th candidate signature file can be flagged and removed from further consideration for matching.

In one example, block 408 may optionally be repeated after block 412, such that features between the signature stream and the signature files can be repeatedly compared to determine when or if substantially matching features stop occurring.

Example modules (including client devices and servers) described above and the example methods may be used in various applications, some of which are described below in more detail.

IV. False Positive Detection

Figure 6:
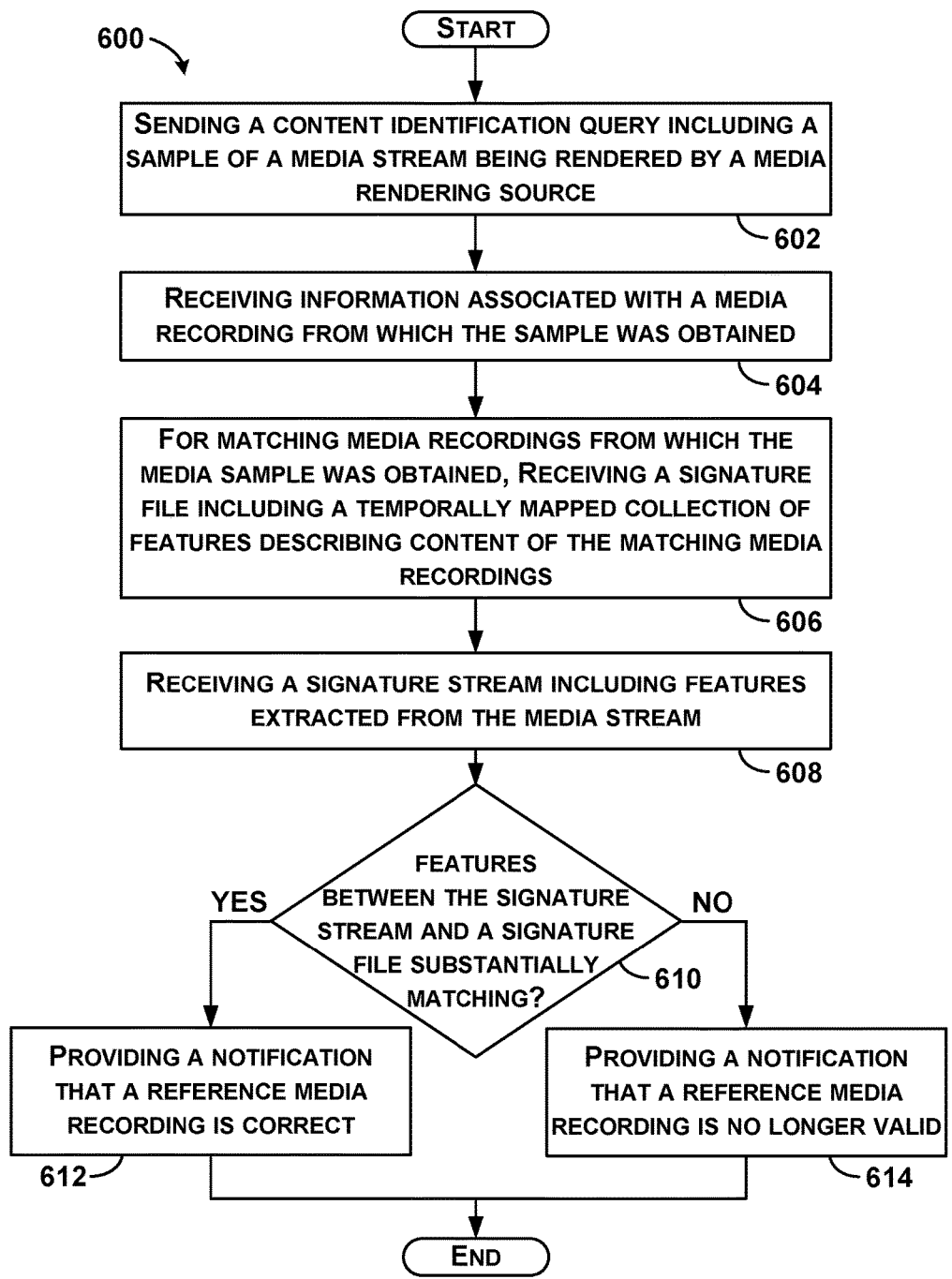
FIG. 6 is a block diagram of an example method to process samples of media including performing a false positive detection, in accordance with at least some embodiments described herein.

FIG. 6 is a block diagram of an example method to process samples of media including performing a false positive detection, in accordance with at least some embodiments described herein. Method 600 shown in FIG. 6 presents an embodiment of a method that, for example, could be used with the system shown in FIG. 1 or FIG. 2, for example, and may be performed by a device (or components of the device) or by a server. Method 600 may include one or more operations, functions, or actions as illustrated by one or more of blocks 602-612. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At blocks 602, the method 600 includes sending a content identification query including a sample of a media stream being rendered by a media rendering source. For example, a client device may capture a sample of a media stream and may send the sample to a server.

At block 604, the method 600 includes receiving information associated with a media recording from which the sample was obtained. For example, the server may perform a content identification of the sample and may return information associated with the content identification to the client device. In an alternate example, the client device may perform a content identification of the sample (in which case block 602 may be omitted from the method 600).

At blocks 606 and 608, the method 600 includes for matching media recordings from which the sample was obtained receiving a signature file including a temporally mapped collection of features describing content of the matching media recordings, and receiving a signature stream including features extracted from the media stream, and receiving a signature stream including features extracted from the media stream. Blocks 606 and 608 may be similar to blocks 404 and 406 as described within FIG. 4.

At block 610, the method 600 includes determining whether features between the signature stream and a signature file are substantially matching. Block 610 may be similar to block 408 described above within FIG. 4.

At block 612, if the features between the signature stream and a signature file are substantially matching, the method 600 includes providing a notification that a reference media recording is correct. For example, the reference media recording may be indicated within the information associated with the media recording that was received at block 604 to identify the media recording from which the sample was obtained. Thus, if the features between the signature stream (which is collected from the media stream at times including before, during, and after the sample was collected) match features in the signature file for the reference media recording along the length of the signature file, then the reference media recording is being rendered within the media stream. The client device may thus provide a notification indicating identification of the media recording being rendered by the media stream.

At block 614, if the feature between the signature stream and the signature file are not substantially matching, the method 600 includes providing a notification that a reference media recording is no longer valid. For example, initially, at block 604, a client device may receive information identifying the media recording from which the sample was obtained, i.e., the media recording being rendered by the media rendering source. Subsequently, additional information about the media stream may be obtained in the signature stream, and at a later point in time, the features in the signature stream may not match the signature file when the reference media recording is no longer being rendered by the media rendering source or the wrong version was initially identified. Thus, the client device can provide a notification at a time when the reference media recording is no longer valid.

Method 600 may be performed to verify after a content identification correctness of a candidate matching result and to detect a false positive. In one example, a content identification system may select a highest-scoring candidate and verify the selected candidate by performing additional computational content identifications at later times using subsequently obtained samples. However, in another example using the method 600 in FIG. 6, a content identification can be verified without performing additional computational content identifications.

In one example, in content identification systems (i.e., such as in any of the example systems described above) there may be a tradeoff near a score threshold between having a lower recognition rate versus a higher false positive rate. If a threshold is lowered then both recognition rate and false positive rates may increase; conversely a higher threshold may lead to lower recognition rates but fewer false positives. False positive content identifications can be lowered by increasing a sample recording time (e.g., increasing a size of the sample). However, longer sampling times may lead to higher wait times for results. An example content identification system may use techniques with a lower threshold or shorter sampling times for content identification, which may result in higher false positives, but the example content identification system may verify and correct recognitions by performing the method 600 in FIG. 6.

The method 600 may be used to verify in an extended region around the original sample (e.g., using a signature stream) whether there is a sufficient density of matching features appearing in expected locations in the reference signature file of a reported result of the content identification. If a loss of continuity in the extended region occurs, then a false positive may be flagged and an appropriate action may be taken on the client device, such as withdrawing the identification result. After content identification, if good continuity is initially detected in an extended region, followed by a loss of continuity for some threshold amount of time then another interpretation may be that the identified content has ended or is otherwise no longer present in the media stream. This may occur, for example, if after performing content identification of music playing from a radio, the radio is turned off or a radio channel is changed. In such a case, the content identification may initially be deemed valid, followed by a notification that the content identification is no longer valid, for example.

V. Multiple Media Recording Version Disambiguation

In one example, the method 600 in FIG. 6 for false positive detection may also provide for disambiguating between multiple versions of a media recording. For example, multiple candidate results may be legitimate matches to a sample based on a content identification due to different edited versions of a recorded work being available. In one instance, media stream content may include media recordings such as a radio mix, a dance mix, or mash-up version of a song and the sample (which may be short in time or length) may match to each one of these versions of the media recording.

By considering multiple candidate content identification results and scanning in and around an extended time span within a signature stream for verification, divergences in versions of matching media recordings can be detected if a subset of reference signature files stop exhibiting matching features versus another subset that extends matching features further into a signature stream, for example. Each candidate reference signature file may be verified along its length against an available extent of the signature stream looking for a longest extent of continuity, as well as a highest density of matching features, for example. A version that has a longest continuity length or a highest density score of matching features may be considered the winner and may replace a previous content identification winner displayed on the client device.

In one example, in disambiguating multiple media recording versions, a sample may match a reference media recording at multiple points if the reference media recording has repetitive content, for example, a repeated chorus. In such an instance, multiple synchronization points may be detected by having the content identification module return a candidate match for each matching offset, for example, looking for multiple cross-correlation peaks, points of high bitmap raster matching scores, or multiple time-difference histogram peaks. As more media stream context is scanned, candidates at incorrect offsets may eventually diverge from tracking and can be flagged and eliminated from consideration.

Figure 7:
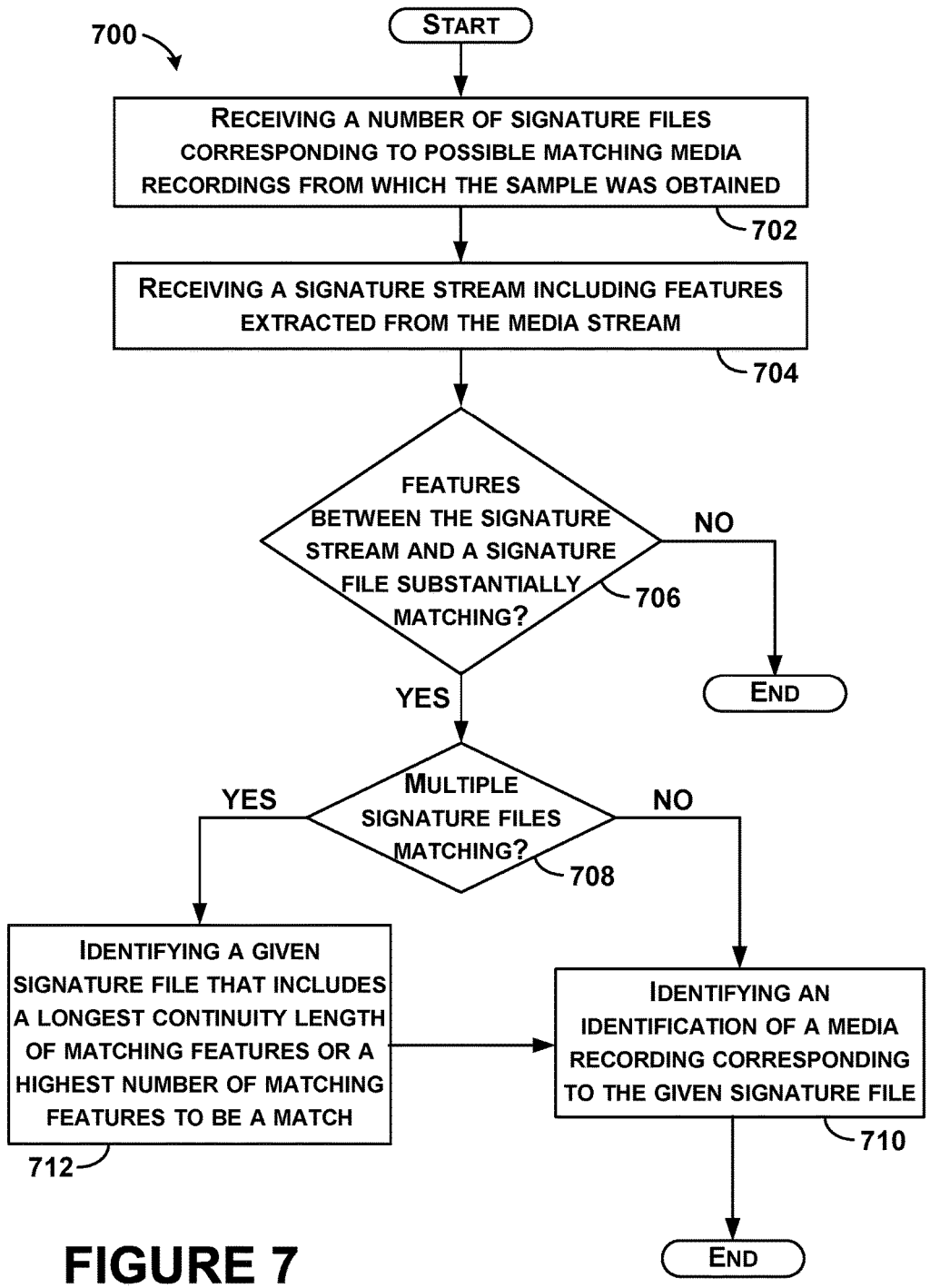
FIG. 7 is a block diagram of an example method to process samples of media including disambiguating between multiple matching media recordings, in accordance with at least some embodiments described herein.

FIG. 7 is a block diagram of an example method to process samples of media including disambiguating between multiple matching media recordings, in accordance with at least some embodiments described herein. Method 700 shown in FIG. 7 presents an embodiment of a method that, for example, could be used with the system shown in FIG. 1 or FIG. 2, for example, and may be performed by a device (or components of the device) or by a server. Method 700 may include one or more operations, functions, or actions as illustrated by one or more of blocks 702-712. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At blocks 702 and 704, the method 700 includes receiving a number of signature files corresponding to possible matching media recordings from which the sample was obtained, and receiving a signature stream including features extracted from the media stream. Blocks 702 and 704 may be similar to blocks 404 and 406, respectively, as described within FIG. 4.

At block 706, the method 700 includes determining whether features between the signature stream and a signature file are substantially matching over time. Block 706 may be similar to block 408 as described within FIG. 4. If no features are matching between the signature stream and the signature file, then the method 700 ends.

If features between the signature stream and a signature file are substantially matching, at block 708, the method 700 includes determining whether multiple signature files are matching. For example, in an instance in which multiple versions of a song have matching portions to a sample, multiple signature files may match to the signature stream. At block 710, if multiple signature files are not matching, then the method 700 includes identifying an identification of a media recording corresponding to the given signature file.

If multiple signature files are matching, at block 712, the method 700 includes identifying a given signature file that includes a longest continuity length of matching features or a highest number of matching features to be a match. Subsequently, an identification of a media recording corresponding to the given signature file can be determined.

In one example, using the method 700, a signature file can be compared to the signature stream to find a signature file that has a highest number of matching features or a longest continuity length of matching features. This can be used to determine if a whole track, for example, matches to a signature file. A remaining number of signature files that were received as possible matches can be discarded.

In one example, a server may include or access a database of media recordings. The database may include duplicates of recordings, and the method 700 may be used to identify duplicates in the database, which may then be deleted from the database.

Figure 8:
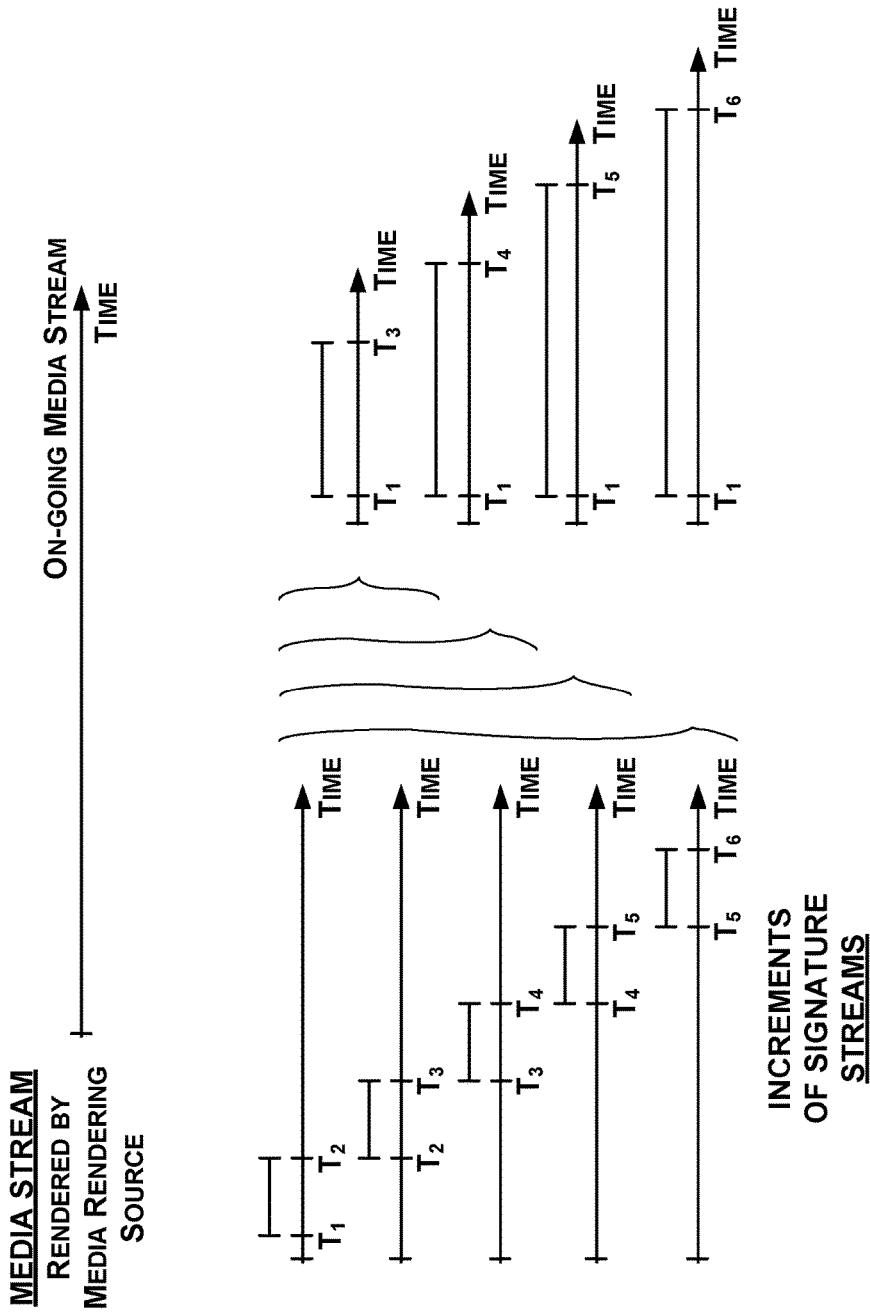
FIG. 8 illustrates an example timing diagram.

FIG. 8 illustrates an example timing diagram. A media stream may be rendered by a media rendering source in an on-going manner. FIG. 8 illustrates examples of signature streams that may be generated to be compared to received signature files. Initially, a first signature stream increment may be generated within the time segment (T1,T2). Subsequent increments of the signature stream may be obtained periodically (e.g. every second) during the rendering of the media stream so as to obtain additional features from the media stream for comparison to the signature files. In one example, the signature stream is stored in a buffer, and the subsequent increments are added to the buffer so that the signature stream grows over time as shown in FIG. 8. The buffer may store a predetermined amount of a signature stream that may encompass an entire media recording, such as for example, a length of about 3-60 minutes.

By generating larger signature streams from the media stream, a known region of continuity of the signature file can be verified forward and backward in time from a synchronization point $T_0$ (e.g., time at which a sample was obtained) until beginning and ending points of loss of continuity are found.

In one example, if there are multiple candidate matches from a content identification result, each candidate signature file can be compared to a stored signature stream both forward and backward in time until continuity is lost in one or both directions. For each candidate signature file, a continuity length of the matching portion can be determined from a time difference between continuity endpoints, and possibly also taking into account a speed ratio $R_k$. A candidate signature file with a longest continuity length may be considered to be a best matching file.

VI. Dynamic Disambiguation of Multiple Slave Media Streams

In another example, systems and methods described herein may provide a way of disambiguating synchronization between a master media stream and a group of candidate slave media streams that is selected through a content identification and at least a best matching slave media stream is rendered in synchrony to the master media stream.

In one example, a client device may receive a slave media stream and may render the slave media stream in synchrony to the master media stream being rendered by a media rendering source. A client device may be configured to receive or determine a time offset of a sample obtained from a media stream that indicates a time position in the media stream corresponding to a sampling time of the sample. The client device may also be configured to receive or determine a timescale ratio that indicates a speed at which the media stream is being rendered by the media rendering source based on a reference speed of the media stream. A real-time offset that indicates a present time is then determined using a real-time timestamp, the timestamp of the media sample, the time offset, and optionally the timescale ratio. The real-time offset may be calculated using Equation (1) or Equation (5) described above. The client device can then render a second media stream (e.g., a slave media stream) at a position corresponding to the real-time offset to be in synchrony to the media stream (e.g., master media stream) being rendered by the media rendering source. The client device may receive the second media stream, or may select the second media stream from memory or from a database, for example, based on an identity of the media stream being rendered by the media rendering source. The second media stream may be related to the media stream being rendered by the media rendering source.

An example master media stream may include a song and an example slave media stream may include time-annotated lyrics that may be displayed in synchrony to the song. In this manner, a client device may display song lyrics synchronized to a song being played by a second device or media rendering source. A user of the first device may thus view lyrics corresponding to identified ambient music in real-time. The lyrics text may be displayed at a temporal position in synchrony with the ambient music.

Figure 9:
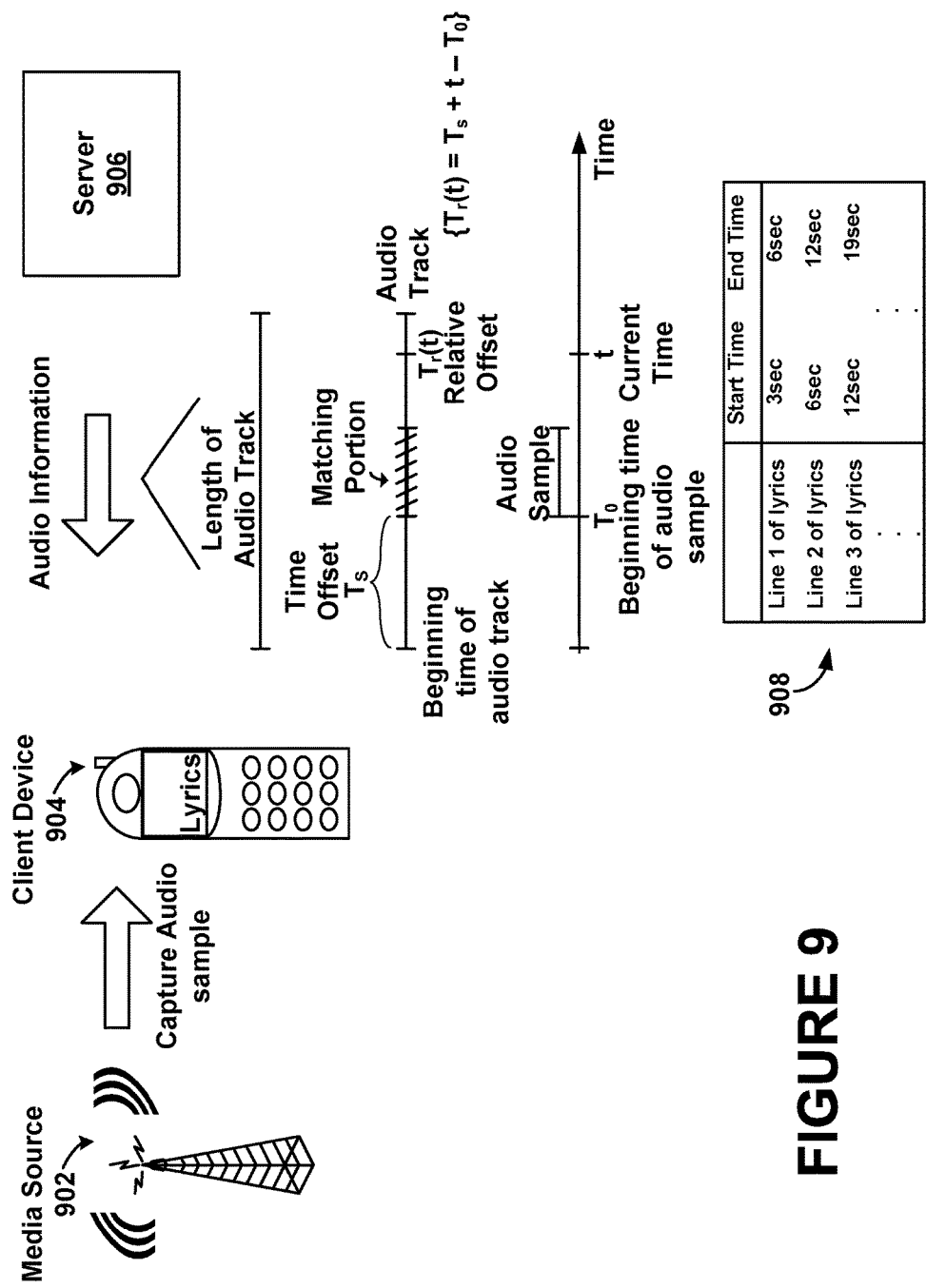
FIG. 9 illustrates an example of a system for identifying media stream, and synchronizing data with the identified media stream.

FIG. 9 illustrates an example of a system for identifying a media stream, and synchronizing data with the identified media stream. In the system of FIG. 9, the media stream may be a song, and the system is operated to capture a sample of the song being rendered by a random media rendering source 902 using a client device 904, and to identify a time offset of the sample and subsequently provide a synchronized display of lyrics of the song on the client device 904.

The client device 904 can be used to capture a sample of a song from the media rendering source 902 and then send the sample to a server 906 via a wireless or wired communication. Operation of the client device 904 and the server 906 may be similar to the client device 104 and the server 106 described in FIG. 1. The server 906 may be configured to receive the sample from the client device 904 and to perform a content identification using any of the methods described herein. Information about the song and a batch file including lyrics of the song can be sent to the client device 904, as shown in FIG. 9. A portion of the information may include the estimated identified media stream position $T_S$, which the client device 904 can use to calculate the estimated real-time media stream position $T_r(t)$. The estimated identified media stream position $T_S$ is a time within the length of the identified audio track corresponding to a sampling time (e.g. beginning) of the audio sample. The lyrics may be time-annotated lyrics 908 that include information as to media stream time positions per line or word of the lyrics. In one example, the lyrics may be included in an XML file that includes time fields comprising the annotations, or the timing information may be embedded within the lyrics in other ways. The client device 904 can render lyrics at the time position $T_r(t)$ so that the text of the lyrics are displayed in synchrony (e.g., at the same or about the same time) with the lyrics being rendered by the media rendering source 902. Alternatively, the server 906 may not send the all lyrics of the song to the client device 304 in a file, but rather, may stream the lyrics to the client device 904 in synchrony with the song being rendered by the media rendering source 902.

Using methods described herein, in examples where a version or offset of the synchronized candidate slave media stream is ambiguous from a content identification result, a best matching slave media stream may be identified. Incorrect slave media streams can be flagged and dropped from a candidate group being tracked. For a k-th candidate slave media stream, a corresponding slave reference signature file that is time-aligned to the k-th slave media stream can be provided, in addition to an offset $T_{s,k}$ of the sample within the k-th media stream, and optional speed ratio $R_k$. If the k-th slave media stream is a current best match, then that slave media stream is displayed at a corresponding time offset as described in Equation (7).

Figure 10:
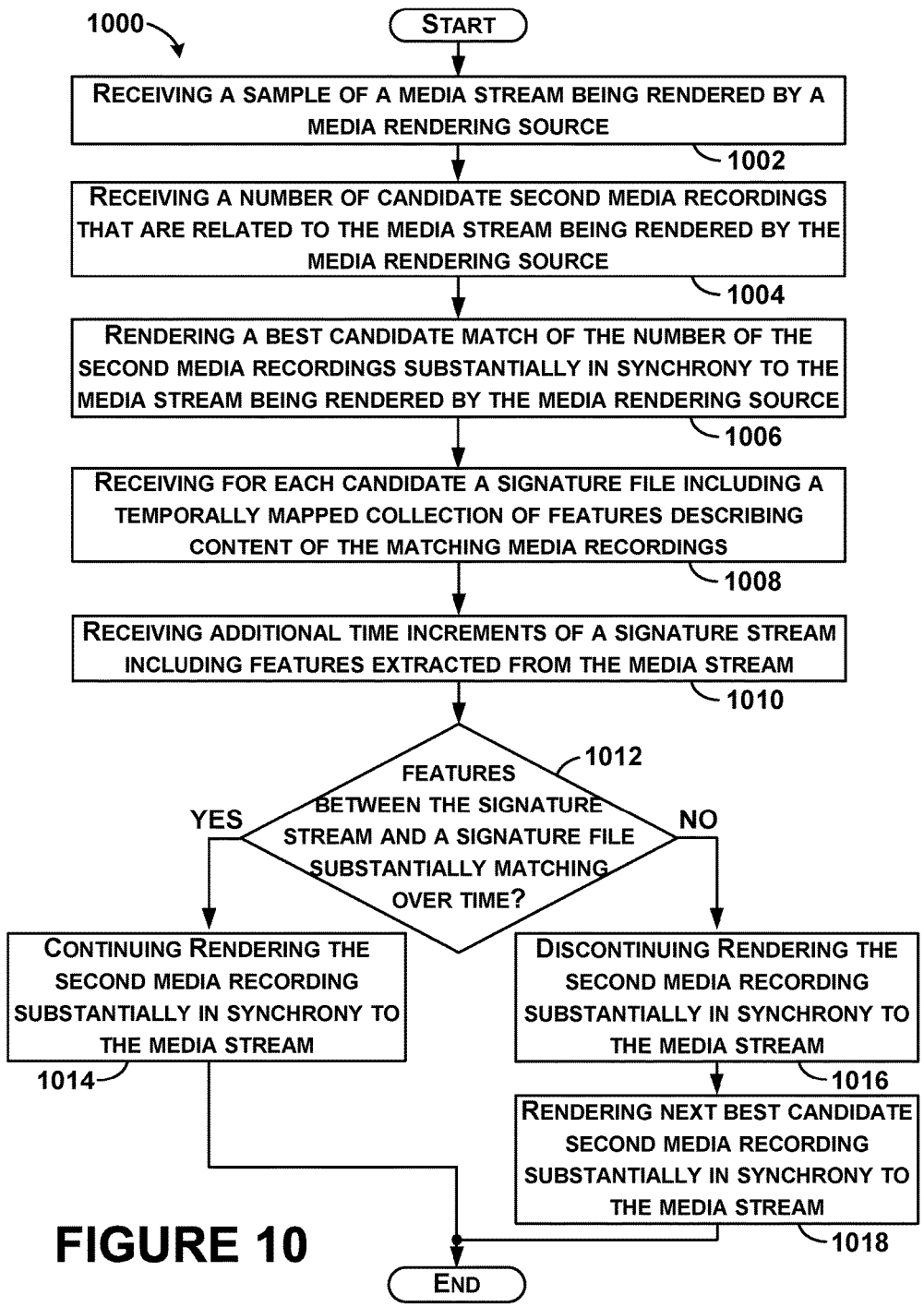
FIG. 10 is a block diagram of an example method to process samples of media including disambiguating between multiple matching slave media recordings, in accordance with at least some embodiments described herein.

FIG. 10 is a block diagram of an example method to process samples of media including disambiguating between multiple matching slave media recordings, in accordance with at least some embodiments described herein. Method 1000 shown in FIG. 10 presents an embodiment of a method that, for example, could be used with the system shown in FIG. 1, FIG. 2 or FIG. 9, for example, and may be performed by a device (or components of the device) or by a server. Method 1000 may include one or more operations, functions, or actions as illustrated by one or more of blocks 1002-1016. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At block 1002, the method 1000 includes receiving a sample of a media stream being rendered by a media rendering source. At block 1004, the method 1000 includes receiving a number of candidate second media recordings that are related to the media stream being rendered by the media rendering source. For example, referring to FIG. 1, a media stream library database 128 may be provided that includes media streams with reference identifiers that relate to media recordings in the media recording database 126. In one example, where the media stream is a song, candidate second media recordings may be lyrics of the song. The number of candidate second media recordings that are received can vary, and each may be considered a positive match.

At block 1006, the method 1000 includes rendering a best candidate match of the number of candidate second media recordings substantially in synchrony to the media stream being rendered by the media rendering source. For example, the client device may determine a best matching candidate within the number of candidates based on a matching score of each of the candidates, and then may render the best candidate lyrics to be substantially in synchrony to the song.

At blocks 1008 and 1010, the method 1000 includes receiving for each candidate a signature file including a temporally mapped collection of features describing content of the matching media recordings, and receiving additional time increments of a signature stream including features extracted from the media stream. Blocks 1008 and 1010 may be similar to blocks 404 and 406 as described within FIG. 4.

At block 1012, the method 1000 includes determining for each candidate whether features between the signature stream and the corresponding signature file are substantially matching over time. Block 1012 may be similar to block 408 as described within FIG. 4. When features between the signature stream and a signature file are substantially matching over time, at block 1014 the method 1000 includes continuing rendering the second media recording substantially in synchrony to the media stream.

When features between the signature stream and a signature file are not substantially matching, at block 1016, the method 1000 includes discontinuing rendering the second media recording substantially in synchrony to the media stream. In one example, initially based on a content identification result, a signature file does match the media stream (based on the sample); however, if the features between the signature stream and the signature file are not matching at block 1012, then it is possible that the media stream has been terminated. This may occur, for example, if a radio is turned off or a channel is changed. If continuity is unexpectedly lost and a slave media stream was being rendered by the client device then the slave media stream may be correspondingly terminated. This may be performed in an example where lyrics or a music video were being synchronized to ambient music and then the music was turned off; the lyrics could then be stopped from continuing to be displayed as if the music were continuing.

At block 1018, the method 1000 includes rendering the next best candidate second media recording substantially in synchrony to the media stream. For example, after receiving additional time increments of the signature stream at block 1010, additional evidence is known that is used to compare new increments of the signature stream with signature files looking for expected features in expected locations. When candidate matches stop matching (such as shown at block 1016), such candidate matches are disqualified or invalidated for future use with the media stream. Once a candidate that was previously a best match is no longer substantially matching over time, the next best candidate match can be selected (as shown at block 1016).

Using the method 1000, for example, a manner of disambiguating synchronization between a master media stream and a group of candidate slave media streams (e.g., selected through content identification by the system) is provided. In cases where a version or offset of a synchronized candidate slave media stream is ambiguous from content identification, the method 1000 may be used to dynamically determine which slave media stream and offset is a best match. Incorrect slave streams that are flagged as being no longer synchronized may be dropped from the candidate group being tracked. For a k-th candidate, a corresponding slave reference signature that is time-aligned to the k-th slave media object is provided to a continuity detection module, in addition to an offset $T_{s,k}$ of the sample within the k-th media stream, and optional speed ratio $R_k$. The best matching slave media stream may then be rendered in synchrony with the master media stream. If the k-th slave media stream is the current best and is displayed, at master media stream time t the k-th slave media object is rendered at a corresponding time offset $$T_{r,k}(t) = T_{s,k} R_k^* (t - T_0)$$

within the k-th slave media stream time coordinates. If a new slave media stream is determined to be the best matching then a corresponding new slave media stream is cut in and rendered instead of the previous slave media stream, for example.

In example lyric synchronization systems, multiple lines of lyrics may be displayed, including upcoming lines of lyrics looking ahead in time. In the presence of multiple versions or multiple offsets, if an impending bifurcation in synchrony is known to be approaching the look-ahead line display window can be narrowed so as to inhibit displaying the ambiguous or divergent lyrics past the ambiguous version branch point. Once the bifurcation point is reached, incorrect versions or offsets may fall out of consideration. As soon as a correct version is determined, then lyric display look-ahead may be allowed to refill with the disambiguated lyric versions, for example.

VII. Resynchronization of Media Streams

In one example, if synchronization between a master media stream and a slave media recording is lost then an additional stage of attempting to re-acquire synchrony can be performed. Resynchronization may be performed through a content identification, or a position identification within a media recording that was being followed. Resynchronization may be attempted to resynchronize the master media stream and the slave media stream to resume rendering of the slave media stream at an appropriate position when the master media stream is resumed. Resynchronization may be performed every few seconds, for example.

In one example, where a master media stream has not been changed, but rather has been paused, a position identification may be performed to reacquire synchrony of the slave media stream. For instance, identity of a recording being rendered in the master media stream may be known from a content identification result, however, a time offset of the recording in the media stream may have been lost. A position identification may be performed using the reference signature file of the matching media recording to identify the time offset in the media stream of the known recording.

Figure 11:
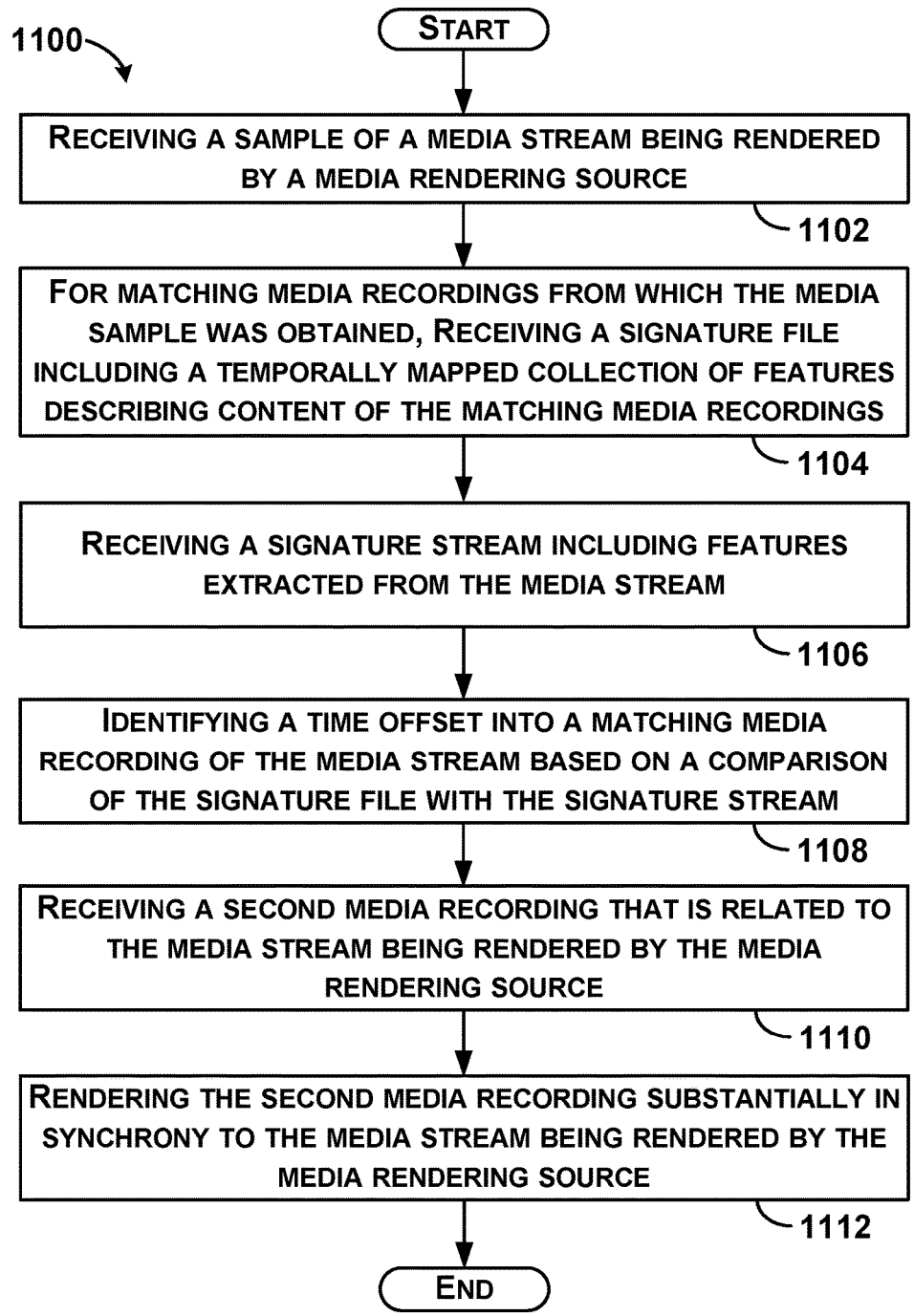
FIG. 11 is a block diagram of an example method to process samples of media including disambiguating between multiple matching slave media recordings, in accordance with at least some embodiments described herein.

FIG. 11 is a block diagram of an example method to process samples of media including disambiguating between multiple matching slave media recordings, in accordance with at least some embodiments described herein. Method 1100 shown in FIG. 11 presents an embodiment of a method that, for example, could be used with the system shown in FIG. 1, FIG. 2 or FIG. 9, for example, and may be performed by a device (or components of the device) or by a server. Method 1100 may include one or more operations, functions, or actions as illustrated by one or more of blocks 1102-1112. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

At blocks 1102, 1104, and 1106, the method 1100 includes receiving a sample of a media stream being rendered by a media rendering source, for matching media recordings from which the sample was obtained receiving a signature file including a temporally mapped collection of features describing content of the matching media recordings, and receiving a signature stream including features extracted from the media stream, and receiving a signature stream including features extracted from the media stream. Blocks 1102, 1104, and 1106 may be similar to blocks 402, 404, and 406, respectively, as described within FIG. 4, for example.

At block 1108, the method 1100 includes identifying a time offset into a matching media recording of the media stream based on a comparison of the signature file with the signature stream. For example, a search may be performed to check correspondence of the media recording and the media stream by periodically scanning the signature file for correspondence matches by searching for a plurality of matching features in expected locations based off of individual matching features. In a particular example, linear correspondences (as described in U.S. Pat. No. 6,990,453, by Wang and Smith, which is hereby entirely incorporated by reference) may be verified for of matching features. The speed ratio $R_k$ may be taken into account when calculating the expected locations, for example.

At blocks 1110 and 1112, the method 1100 includes receiving a second media recording that is related to the media stream being rendered by the media rendering source, and rendering the second media recording substantially in synchrony to the media stream being rendered by the media rendering source. Blocks 1110 and 1112 may be similar to blocks 1004 and 1006 as described in FIG. 10, for example. The second media recording can be rendered at a position corresponding to the identified time offset of the matching media recording so that the second media recording and the media recording being rendered in the media stream are in synchrony (or substantially in synchrony).

In one example, a user may be watching a digital video recorder (DVR) and may pause and restart a recording in which a client device has identified and renders a second media recording in synchrony with the DVR. Once the DVR is paused, the second media recording will fall out of synchrony. The client device may be configured to perform the method 1100 to resynchronize the second media recording with the DVR, for example. The client device may be configured to continually monitor a time offset of a matching media recording by performing position identifications using the signature file and received signature streams to maintain synchronization of a rendered second media recording.

In another example, if a new slave media recording is judged to be the best matching then a corresponding new slave media recording can replace the previously rendered slave media recording. For example, if a radio station is changed and a new media recording is rendered by the media rendering source, a new content identification may be performed. In an example lyric synchronization system, multiple lines of lyrics may be displayed, including upcoming lines of lyrics looking ahead. If an impending bifurcation is known to be coming, a look-ahead line display window can be narrowed so as to inhibit displaying ambiguous or divergent lyrics past an ambiguous version branch point. Once a bifurcation point is reached, incorrect versions or offsets may fall out of consideration. As soon as a correct version is determined, then a lyric display look-ahead may be allowed to refill with the disambiguated lyric version.

VIII. Synchronization Adjustment

In another example, in a content identification, an estimate of a speed ratio $R_k$ may be determined based off of a short sample (e.g., a sample of about 5-10 second long). The speed ratio $R_k$ indicates a relative speed of a master stream relative to a reference recording. In one example, the speed ratio $R_k$ may be determined or updated using locations of matching features of the signature file and the signature stream. For instance, the speed ratio $R_k$ may be updated by applying a least-squares estimate on locations of matching features. In one example, a feedback system may be applied that maintains alignment based on error, such as described by Haykin, Simon, "Adaptive Filter Theory", 4th Edition, New Jersey, Prentice Hall 2001.

In one example, initial parameters for continuity tracking may be estimated from a sample of a small size (e.g., about 5-10 seconds long). As more segments of the media stream are analyzed (and obtained within a signature stream) more data is available to tune the tracking parameters. Example parameters to use for time alignment include an initial time offset $T_{s,k}$ and a speed skew ratio $R_k$. Given corresponding matching locations $t_j$ and $t'_{j,k}$, as described above, the example parameters can be fine-tuned.

For example, a least-squares fit may be used to minimize an error term $$\varepsilon(R_k, T_{s,k}) = \sum_j [t'_{j,k} - T_{s,k} + R_k * (t_j - T_0)]^2 \quad \text{Equation (13)}$$

which may be minimized when $$\frac{\partial \varepsilon}{\partial R_k} = -2\sum_j (t_j - T_0)[t'_{j,k} - T_{s,k} + R_k * (t_j - T_0)] = 0 \quad \text{Equation (14)}$$

and

-continued $$\frac{\partial \varepsilon}{\partial T_{s,k}} = -2\sum_j [t'_{j,k} - T_{s,k} + R_k * (t_j - T_0)] = 0 \quad \text{Equation (15)}$$

This is attained when $$R_k = \frac{N\sum_j t'_{j,k}(t_j - T_0) - \sum_j (t_j - T_0)\sum_j t'_{j,k}}{N\sum_j (t_j - T_0)^2 - [\sum_j (t_j - T_0)]^2} \quad \text{Equation (16)}$$

and $$T_{s,k} = \frac{\sum_j (t_j - T_0)^2 \sum_j t'_{j,k} - \sum_j (t_j - T_0)\sum_j t'_{j,k}(t_j - T_0)}{N\sum_j (t_j - T_0)^2 - [\sum_j (t_j - T_0)]^2} \quad \text{Equation (17)}$$

where N is the number of matching features over which j iterates. If $T_{s,k}$ is taken as fixed then $R_k$ is the free variable so that Equation (14) can be solved, and $$R_k = \frac{\sum_j (t_j - T_0)(t'_{j,k} - T_{s,k})}{\sum_j (t_j - T_0)} \quad \text{Equation (18)}$$

Using this example method, the matching constraints may be used:

$$|t'_{j,k} - T_{s,k} + R_k*(t_j - T_0)| < \delta_t \quad \text{Equation (19)}$$

$$|F_j - F'_{j,k}| < \delta_F \text{ or } D(F_j, F'_{j,k}) < \delta_F \quad \text{Equation (20)}$$

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

What is claimed is:

1. A method comprising:
receiving from a server into a local cache on a computing device a signature file of fingerprints of media content and corresponding identifiers of the media content after the computing device sends one or more initial fingerprints determined from a media stream by the computing device, wherein the fingerprints in the signature file are for features anticipated to appear in the media stream at predetermined times; and
the computing device using the cached fingerprints of media content in the signature file to identify a media content item within the media stream based on one or more additional fingerprints determined from the media stream.

2. The method of claim 1, wherein the fingerprints of media content in the signature file include fingerprint sequences of the media content that follow the one or more initial fingerprints.

3. The method of claim 1, wherein the fingerprints of media content in the signature file include audio fingerprint sequences of potentially identified songs that share the one or more initial fingerprints.

4. The method of claim 1, further comprising:
the computing device using a microphone to record one or more samples of the media stream; and
extracting the one or more additional fingerprints from the one or more recorded samples.

5. The method of claim 1, further comprising using the fingerprints of media content in the signature file to identify another media content item within the media stream without intervention by a user.

6. The method of claim 1, further comprising:
when correspondences between the cached fingerprints of media content in the signature file and the one or more additional fingerprints determined from the media stream stop occurring at expected locations, determining a discontinuity of alignment; and
based on determining the discontinuity of alignment, performing a second content identification function of the media stream.

7. The method of claim 1, further comprising extracting the one or more initial fingerprints from the media stream by the computing device.

8. The method of claim 1, wherein the computing device includes a portable device operable according to executable instructions to continuously monitor the media stream and to identify media content items within the media stream.

9. The method of claim 1, wherein the fingerprints in the signature file correspond to candidate media content items matching the one or more initial fingerprints sent by the computing device, and the method further comprises:
the computing device resolving the candidate media content items to identify a match.

10. The method of claim 1, wherein the one or more fingerprints are sent by the computing device and correspond to a sample of the media stream, and the method further comprises:
the computing device determining a time offset corresponding to an offset of a sampling time of the sample within a reference media recording; and
the computing device determining an alignment of the cached fingerprints of media content in the signature file to the one or more additional fingerprints based on the time offset.

11. A method comprising:
receiving from a server into a local cache on a computing device a signature file of fingerprints of media content and corresponding identifiers of the media content, after the computing device sends one or more initial fingerprints determined from a media stream by the computing device, for a continuity tracking function and a content identification function performed by the computing device, wherein the fingerprints in the signature file are for features anticipated to appear in a media stream being monitored by the computing device;
the computing device performing the continuity tracking function using the cached fingerprints of media content in the signature file to track features matching between the media stream and the signature file; and
the computing device switching to the content identification function based on the continuity tracking function determining a discontinuity of features between the media stream and the signature file, in which a transition has occurred between a media content item identified through use of the cached fingerprints in the signature file and a new unidentified media content item of the media stream.

12. The method of claim 11, wherein switching comprises switching between the continuity tracking function, the content identification function, and a second content identification function in which the computing device relies upon a server to act upon fingerprints sent from the computing device which cannot be resolved by the computing device using the cached fingerprints of media content.

13. The method of claim 12, further comprising receiving into the local cache an updated signature file of fingerprints of media content and corresponding updated identifiers of the media content upon a successful identification of one or more media content items for the fingerprints which were not resolved using the cached fingerprints of media content.

14. The method of claim 11, wherein the continuity tracking function includes resolving a single media content item from among a plurality of candidates as matching to the media stream.

15. The method of claim 11, wherein switching between the continuity tracking function and the content identification function occurs without intervention by a user.

16. The method of claim 11, further comprising:
the computing device using a microphone to record one or more samples of the media stream; and
extracting the features of the media stream from the one or more recorded samples.

17. The method of claim 11, wherein the computing device is configured to use the fingerprints of media content in the signature file to identify a given media content item.

18. The method of claim 11, further comprising determining that the transition has occurred between the media content item identified through use of the cached fingerprints in the signature file and the new unidentified media content item based on determination of the discontinuity by the continuity tracking function.

19. The method of claim 18, further comprising identifying a plurality of candidates for the new unidentified media content item via a second content identification function in which the computing device relies upon a server to act upon fingerprints sent from the computing device which cannot be resolved by the computing device using the cached fingerprints of media content.

20. The method of claim 11, wherein the computing device includes a portable device operable according to executable instructions to continuously monitor the media stream and to identify media content items within the media stream.

21. A method executable by a computing device to continuously monitor a media stream and identify media content items within the media stream, the method comprising:
caching a signature file of predetermined fingerprints of media content and corresponding identifiers of the media content from a server after the computing device sends one or more initial fingerprints determined from the media stream by the computing device, wherein the predetermined fingerprints in the signature file are for features anticipated to appear in the media stream at predetermined times; and
the computing device using the cached fingerprints of media content in the signature file to identify a media content item within the media stream based on one or more additional fingerprints determining from the media stream.

22. The method of claim 21, further comprising extracting the one or more initial fingerprints from the media stream by the computing device.

* * * * *